(12) United States Patent
Kerobo et al.

(10) Patent No.: US 11,692,078 B2
(45) Date of Patent: Jul. 4, 2023

(54) COATED FIBER AND METHOD

(71) Applicant: BASF SE, Ludwigshafen (DE)

(72) Inventors: Charles O. Kerobo, Wyandotte, MI (US); John Andrew Randolph, Wyandotte, MI (US); Dennis Frederick Berry, Wyandotte, MI (US)

(73) Assignee: BASF SE, Ludwigshafen (DE)

( * ) Notice: Subject to any disclaimer, the term of this patent is extended or adjusted under 35 U.S.C. 154(b) by 814 days.

(21) Appl. No.: 16/492,817

(22) PCT Filed: Mar. 5, 2018

(86) PCT No.: PCT/EP2018/055268
§ 371 (c)(1),
(2) Date: Sep. 10, 2019

(87) PCT Pub. No.: WO2018/166823
PCT Pub. Date: Sep. 20, 2018

(65) Prior Publication Data
US 2020/0140657 A1 May 7, 2020

Related U.S. Application Data

(60) Provisional application No. 62/470,416, filed on Mar. 13, 2017.

(51) Int. Cl.
| | | |
|---|---|---|
| *C08K 9/04* | (2006.01) | |
| *C09D 7/63* | (2018.01) | |
| *C08J 5/06* | (2006.01) | |
| *C08K 7/02* | (2006.01) | |
| *C09D 179/02* | (2006.01) | |
| *D06M 15/61* | (2006.01) | |
| *D06M 101/32* | (2006.01) | |
| *D06M 101/34* | (2006.01) | |

(52) U.S. Cl.
CPC ............ *C08K 9/04* (2013.01); *C08J 5/06* (2013.01); *C08K 7/02* (2013.01); *C09D 7/63* (2018.01); *C09D 179/02* (2013.01); *D06M 15/61* (2013.01); C08J 2300/26 (2013.01); D06M 2101/32 (2013.01); D06M 2101/34 (2013.01)

(58) Field of Classification Search
CPC ..... C08K 9/04; C08K 7/02; C08K 9/08; C08J 5/06; C08J 2300/26; C08J 5/046; C09D 7/63; C09D 179/02; D06M 15/61; D06M 2101/32; C08L 2203/12; C08L 2205/12; C08L 2205/16; C08L 79/02; C08L 101/00

USPC ......................................................... 428/375
See application file for complete search history.

(56) References Cited

U.S. PATENT DOCUMENTS

| | | | |
|---|---|---|---|
| 2002/0176986 A1* | 11/2002 | Watanabe | .................. C08J 5/08 428/375 |
| 2011/0171867 A1* | 7/2011 | Li | ............................. B32B 5/08 156/60 |
| 2015/0068657 A1* | 3/2015 | Jogikalmath | .......... D21H 17/55 156/39 |
| 2015/0086734 A1* | 3/2015 | Pietsch | ...................... C08J 5/18 428/423.1 |

FOREIGN PATENT DOCUMENTS

| | | |
|---|---|---|
| JP | H059872 A | 1/1993 |
| JP | H11222779 A | 8/1999 |
| JP | 2001003273 A | 1/2001 |
| WO | WO-99/44960 A1 | 9/1999 |
| WO | WO-2016/156589 A1 | 10/2016 |

OTHER PUBLICATIONS

International Application No. PCT/EP2018/055268, International Search Report and Written Opinion, dated May 28, 2018.
Shirai, Hiroaki et al., "Polyester fiber treating agent for improving the fiber adhesion with rubber," XP002780779, CA19 Aug. 1999 (Aug. 19, 1999), retrieved from STN Database accession No. 1999:518898.
Takahashi, Shinichi et al., "Polyester fibers for reinforcing rubber with improved adhesion to rubber and high tensile strength and fatigue resistance in the embedded state in rubber manufactured by coating polyester fibers with polyethylenimine and epoxy compounds and manufacture thereof," XP002780778, CA09 Jan. 2001 (Jan. 9, 2001), retrieved from STN Database accession No. 2001:19172.
Ueda, Kazue, et al., "Treatment of synthetic fibers for improved adhesion to PVC," XP002780780, CA07 Aug. 1993 (Aug. 7, 1993), retrieved from STN Database accession No. 1993:450646.

* cited by examiner

*Primary Examiner* — Hannah J Pak
(74) *Attorney, Agent, or Firm* — Marshall, Gerstein & Borun LLP

(57) ABSTRACT

A coated fiber for polymer reinforcement is disclosed. The coated fiber comprises a fiber and a coating disposed about said fiber. The fiber has a denier of from about 250 to about 3,000. The coating comprises a branched polyethylene imine. The fiber is present in the coated fiber in an amount of from about 80 to about 99.8 percent by weight and the coating is present in the coated fiber in an amount of from about 0.2 to about 20 percent by weight, with percent by weight based on the total weight of the coated fiber. A method of producing the coated fiber is also disclosed.

25 Claims, 14 Drawing Sheets

COATED FIBER AND METHOD

CROSS-REFERENCE TO RELATED APPLICATIONS

This application is the U.S. National Stage application of International Patent Application No. PCT/EP2018/055268, filed Mar. 5, 2018, which claims the benefit of U.S. Provisional Patent Application No. 62/470,416, filed Mar. 13, 2017, incorporated herein by reference in its entirety.

FIELD OF THE DISCLOSURE

The present disclosure generally relates to a coated fiber for polymer reinforcement and a method of producing the coated fiber. The present disclosure further relates to polymeric composites comprising the coated fiber.

BACKGROUND OF THE DISCLOSURE

The use of fillers to improve the physical and rheological properties of polymeric materials is known in the art. For example, the addition of conductive filler to a polymer can impart conductivity on the resulting polymeric composite, despite the fact that the polymer alone would otherwise act as an insulator. As another example, the addition of reinforcing filler, e.g. a reinforcing fiber, to a polymer can impart improved load, creep, fatigue, strength, durability, and other properties on the resulting polymeric composite.

However, the use of fillers in polymeric composites can be problematic. For example, the loading of filler required to achieve polymeric composites having desirable physical and rheological properties can make processing, e.g. compounding, extrusion, injection molding, etc., difficult. Fillers, especially fibrous fillers, can be hard to disperse within a polymer matrix and, thus, conventional methods of combining polymers and fibrous fillers often yield polymeric composites having inconsistent physical and rheological properties. Once polymeric composites are formed, fillers (e.g. fibrous fillers) can delaminate from the polymers (e.g. elastomers) within polymeric composites, which negatively affects the physical and performance properties of such polymer composites.

To address such issues, costly processing adjustments, e.g. increased compounding times and varied compounding temperatures, are often made to conventional methods of combining polymers in an attempt to produce polymeric composites having consistent physical and rheological properties. Further, formulary changes, such as the inclusion of processing additives, are made to polymeric composites in an attempt to (1) produce polymeric composites having consistent physical and rheological properties with conventional methods of combining polymers and fibrous fillers, and (2) minimize the amount of fibrous filler required to obtain polymeric composites having desirable physical and rheological properties. Still further, to address delamination issues, filler treatments, such as the treatment of fibrous fillers with silanes, resorcinol-formaldehyde-latex (RFL), isocyanate, epoxy, and/or ter-polymer lattices comprising vinyl pyridine has been employed to prevent delamination of fibrous fillers from the polymer within polymeric composites. However, many of the filler treatments are known irritants in the work place and, thus, require precautions for use. Further, coating fillers with such treatments can require complicated and expensive coating processes with multiple coating applications.

Accordingly, there remains an opportunity for improvement.

SUMMARY OF THE DISCLOSURE AND ADVANTAGES

The instant disclosure provides a coated fiber for polymer reinforcement, and polymeric composites including the coated fiber. The coated fiber comprises a fiber and a coating disposed about said fiber. The fiber has a denier of from about 250 to about 3,000. The coating comprises a branched polyethylene imine. The fiber is present in the coated fiber in an amount of from about 80 to about 99.8 percent by weight and the coating is present in the coated fiber in an amount of from about 0.2 to about 20 percent by weight, with percent by weight based on the total weight of the coated fiber.

The instant disclosure also provides a method of producing the coated fiber. The method comprises the steps of providing the fiber, providing the coating, and applying the coating composition to the fiber to form the coated fiber.

The coated fiber disclosed herein can be produced efficiently and disperses readily in various polymers. Because the coated fiber disperses readily in various polymers, the inclusion of the coated fiber in polymeric composites often yields polymeric composites having desirable physical and rheological properties. Further, conventional methods of combining polymers and the coated fiber can be used to produce polymeric composites having consistent physical and rheological properties.

BRIEF DESCRIPTION OF THE DRAWINGS

Other advantages of the present invention will be readily appreciated, as the same becomes better understood by reference to the following detailed description when considered in connection with the accompanying drawings.

FIGS. 1-14 are exemplary in nature, are not drawn to scale, and are thus not intended to represent the relative sizes of the various components of the coated fiber.

DETAILED DESCRIPTION OF THE DISCLOSURE

The instant disclosure provides a coated fiber 10 for polymer reinforcement, and a polymeric composite 20 including the coated fiber 10. The polymeric composite 20 can be used in a wide array of commercial and industrial products. In various embodiments, the polymeric composite 20 is used in tires, belts, conveyor belts, hoses, engine mounts, seals, gaskets, and other products. It is to be appreciated that the polymeric composite 20 of the subject disclosure can also be used in products not specifically set forth herein.

The Coated Fiber

Figure 1:
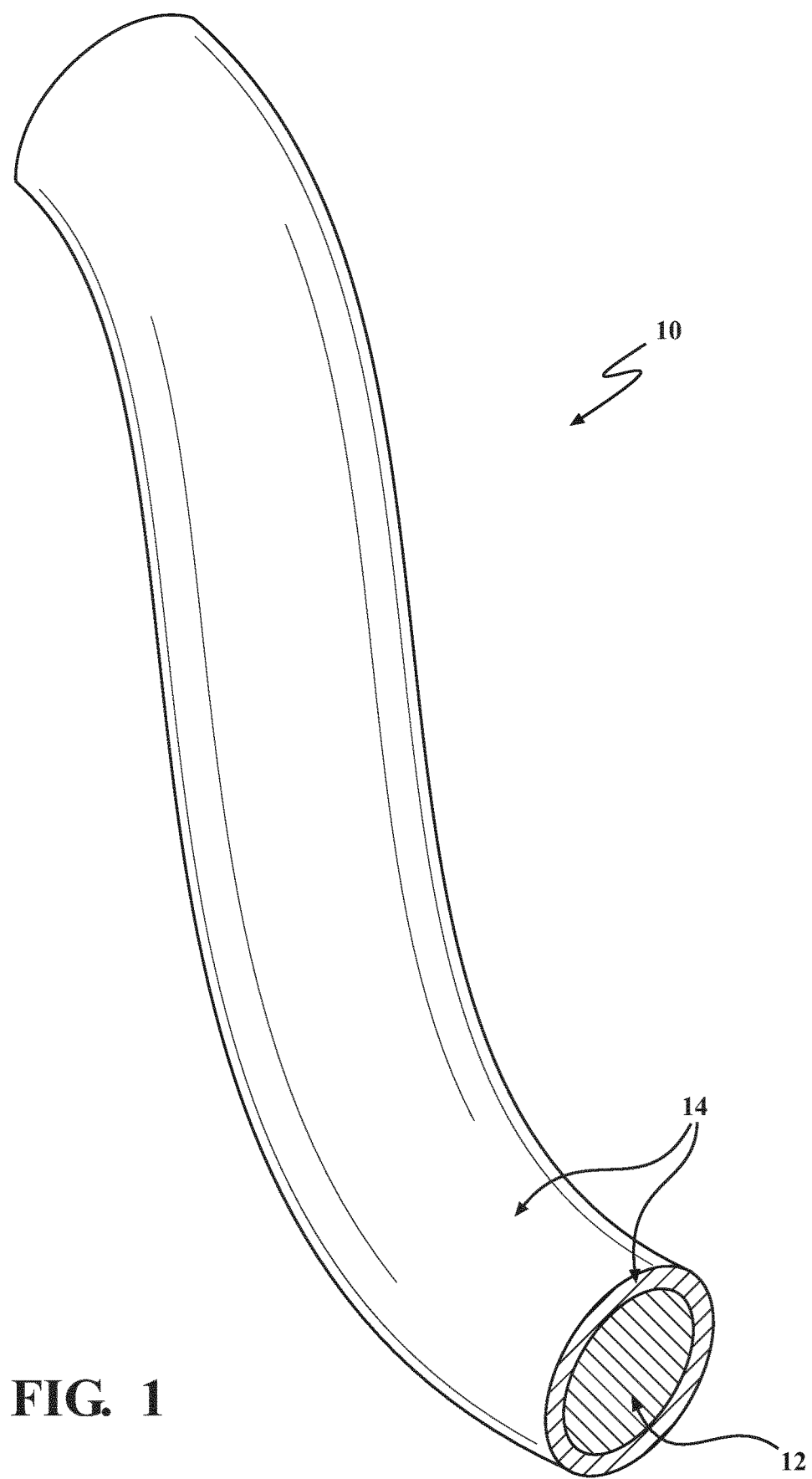
FIG. 1 is an enlarged perspective cross-sectional view of a coated fiber comprising a single strand.

Referring to the FIG. 1, wherein like numerals indicate corresponding parts throughout the several views, the coated fiber is generally shown at 10. The coated fiber 10 comprises a fiber 12 and a coating 14 disposed about said fiber 12.

As used herein, the terminology "disposed about" encompasses the coating 14 being disposed about the fiber 12 and also encompasses both partial and complete covering of the fiber 12 by the coating 14. The coating 14 is disposed about the fiber 12 to an extent sufficient to change the properties of the fiber 12, e.g. to provide the coated fiber 10 that can be efficiently and effectively dispersed in a polymer to form the polymeric composite 20 and, in some embodiments, to provide the coated fiber 10 which can crosslink with a polymer 22 within the polymeric composite 20. As such, any given sample of the coated fiber 10 typically includes fibers 12 having the coating 14 disposed thereon, and the coating 14 is typically disposed on a large enough surface area of each individual fiber 12 so that the sample of the coated fiber 10 can be effectively incorporated into polymeric composites 20 having desirable properties.

In some embodiments, the coating 14 covers greater than about 30, greater than about 40, greater than about 50, greater than about 60, greater than about 70, greater than about 80, greater than about 90, greater than about 95, or greater than about 99, percent of an outer peripheral surface of the fiber 12. In additional non-limiting embodiments, all values and ranges of values, both whole and fractional, within one or more of the aforementioned ranges, are hereby expressly contemplated.

In many embodiments, the coated fiber 10 is cut to a desired length based on its end use (e.g. as in a polymeric composite 20 in a tire, a thermoplastic hose, etc.). In some embodiments, the coated fiber 10 has a length of from about 0.3 to about 25, about 0.5 to about 15, or about 3 to about 6, mm.

The Fiber

In various embodiments, the fiber 12 is selected from the group of polymeric fibers (e.g. acrylic, polyamide fibers, polyester fibers, polyolefin fibers, phenol-formaldehyde/novaloid fibers, etc.), natural fibers (e.g. cellulose fibers, lignin fibers, rayon fibers, wood fibers, etc.), glass fibers (e.g. E-glass, A-glass, E-CR-glass, C-glass, D-glass, S-glass, etc.), ceramic fibers, metallic fibers (e.g. stainless steel, aluminum, etc.), carbon and carbon composite fibers, (e.g. graphite fibers, polyacrylanitrile (PAN) based fibers, carbon nanotube fibers, etc.), mineral fibers (e.g. basalt fibers, etc.), and combinations thereof. In some embodiments, the fibers are composite or multi component fibers comprising any combination of suitable materials set for herein (polymer, metal, mineral, etc.). Examples of such composite fibers include nickel coated carbon fiber, silver coated fibers, and coextruded polymer fibers.

In various specific embodiments, the fiber 12 is selected from the group of acrylic fibers, polyamide fibers, polyester fibers, polyolefin fibers, cellulose fibers, glass fibers, ceramic fibers, novoloid (phenol-formaldehyde) fibers, carbon fibers, mineral fibers, metal fibers, composite fibers comprising at least one of the aforementioned materials, and combinations thereof.

In many embodiments, the fiber 12 comprises, consists essentially of, or consists of glass. In some such embodiments, the glass is further defined as E-glass fibers (aluminoborosilicate glass with less than 1% w/w alkali oxides, A-glass (Alkali-lime glass with little or no boron oxide), E-CR-glass (Electrical/Chemical Resistance; alumino-lime silicate with less than 1% w/w alkali oxides, with high acid resistance), C-glass (alkali-lime glass with high boron oxide content, used for glass staple fibers and insulation), D-glass (borosilicate glass, named for its low Dielectric constant), R-glass (alumino silicate glass without MgO and CaO with high mechanical requirements as reinforcement), and S-glass (alumino silicate glass without CaO but with high MgO content with high tensile strength).

In many embodiments, the fiber 12 comprises, consists essentially of, or consists of a polymer 22. The polymer 22 can be any polymer known in the art and can be produced in any way known in the art, e.g. wet spinning, hot extrusion, etc.

In some embodiments, the polymer is selected from polyamide, polyester, polyolefin, thermoplastic polyurethane (TPU), Poly(vinyl alcohol) (e.g. PVOH, PVA, or PVAl), polyolefins (e.g. polyethylene (PE), ultra high molecular weight PE (UHMWPE), polypropylene (PP)), and combination thereof.

In many embodiments, the fiber 12 comprises, consists essentially of, or consists of a polyamide fiber. The polyamide may be defined as the polymer 22 comprising repeating amide, —CO—NH—, linkages. The polyamide may be a homopolymer (e.g. nylon 6) or a co-polymer (e.g. nylon 6,6, nylon 6/66). As defined herein, copolymers include two or more different monomers.

The polyamide can be an aliphatic, e.g. nylon, or aromatic polyamide, e.g. aramid. In some embodiments, the polyamide is a meta-aramid. In other embodiments, the polyamide is a para-aramid. Aramid fibers are a class of heat-resistant and strong synthetic fibers. In various embodiments, the terminology "consists essentially of" describes the polyamide itself as only a single compound, two compounds, three compounds, etc., and may be free of any other polyamides or compounds.

Typically, the polyamide may be or include, consist essentially of, or consist of one or more nylons, aramids, proteins, metal poly(aspartates) such as sodium poly(aspartate), and combinations thereof.

In some embodiments, the polyamide is an aliphatic or semi-aromatic polyamide such as nylon. Nylons are condensation copolymers typically formed by reacting diamines and dicarboxylic acids to form peptide bonds. In one embodiment, the nylon is further defined as having less than about 85 percent of amide-linkages attached directly (—CO—NH—) to two aliphatic groups. More specifically, the polyamide may be or include, consist essentially of, or consist of one or more of polyamide 6, polyamide 6,6, polyamide 6/66, polyamide 10/10, polyamide 10/12, poly (4-aminobutyric acid) (nylon 4), poly(7-aminoheptanoic acid) (nylon 7), poly(8-aminooctanoic acid)(nylon 8), poly (9-aminononanoic acid) (nylon 9), poly(10-aminodecanoic acid) (nylon 10), poly(11-aminoundecanoic acid) (nylon 11), poly(12-aminododecanoic acid) (nylon 12), nylon 4,6, poly(hexamethylene sebacamide) (nylon 6,10), poly(heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), poly(tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6), poly(tetramethylenediamine-co-isophthalic acid) (nylon 4,1), polyhexamethylene isophthalamide (nylon 6,1), hexamethylene adipamide/hexamethylene-isophthalamide (nylon 6,6/61), hexamethylene adipamide/hexamethyleneterephthalamide (nylon 6,6/6T), poly (2,2,2-trimethylhexamethylene terephthalamide), poly(m-xylylene adipamide) (MXD6), poly(p-xylylene adipamide), poly(hexamethylene terephthalamide), poly(dodecamethylene terephthalamide), polyamide 6T/61, polyamide 6/MXDT/I, polyamide MXDI, a terpolymer of lauryl lactam, isophthalic acid and bis(4-amino-3-methylcyclohexyl)methane and polynorbornamide, and combinations thereof. Even more typically, the polyamide is chosen from polyamide 6, polyamide 6,6, polyamide 6/66, and combinations thereof. In other embodiments, the polyamide is chosen from polyamide 6, polyamide 6,6, polyamide 6/66, polyamide 12, polyamide 11, polyamide 6/10, polyamide 6/6.36, polyamide 61/6T, and combinations thereof.

In preferred embodiments, the polyamide is an aromatic polyamide, i.e., aramid. Aramids are typically formed by reacting amines and carboxylic acid halides. In one embodiment, the aramid is further defined as having at least about 85 percent of amide linkages (—CO—NH—) attached directly to two aromatic rings. The aramid may be any known in the art, but is typically further defined as an AABB polymer, sold under tradenames such as Nomex®, Kevlar®, Twaron® and/or New Star™. As is well known in the art, NOMEX® and New Star™ include predominantly meta-linkages and are typically further defined as polymetaphenylene isophthalamides. Kevlar® and Twaron® are both para-phenylene terephthalamides (PPTA), the simplest form of an AABB para-polyaramide. PPTA is a product of p-phenylene diamine (PPD) and terephthaloyl dichloride (TDC or TCl). Alternatively, the aramid may be further defined as the reaction product of PPD, 3,4'-diaminodiphenylether, and terephthaloyl chloride (TCl). In one preferred embodiment, the polyamide is poly-paraphenylene terephthalamide.

In various embodiments, the polyamide has a weight average molecular weight of greater than about 10,000, or greater than about 25,000, or from about 10,000 to about 1,000,000, or from about 50,000 to about 750,000, or from about 25,000 to about 500,000, g/mol. In additional non-limiting embodiments, all values and ranges of values, both whole and fractional, within one or more of the aforementioned ranges, are hereby expressly contemplated.

In another embodiment, the fiber 12 comprises, consists essentially of, or consists of a polyester fiber. The polyester may be defined as a polymer comprising repeating ester functional groups (esters). In other words, several esters are linked within polyester. Typically, alcohol is chemically reacted with carboxylic acid results to form the esters. Alternatively, the polyester may be defined as a polymer comprising at least about 85 percent by weight of an ester, a dihydric alcohol, a terephthalic acid. The polyester may be a homopolymer or a co-polymer.

In some embodiments, the polyester is an aliphatic polyester. Examples of suitable aliphatic polyesters include, but are not limited to, homopolymers such as polyglycolide or polyglycolic acid (typically formed via polycondensation of glycolic acid), polylactic acid (typically formed via ring-opening polymerization of lactide), polycaprolactone (typically formed via ring-opening polymerization of caprolactone), polyhydroxyalkanoate, and polyhydroxybutyrate. Examples of suitable aliphatic polyesters include, but are not limited to, copolymers such as polyethylene adipate, polybutylene succinate (typically formed via polycondensation of succinic acid with 1,4-butanediol), and poly(3-hydroxybutyrate-co-3-hydroxyvalerate (typically formed via copolymerization of 3-hydroxybutanoic acid and 3-hydroxypentanoic acid, butyrolactone, valerolactone with oligomeric aluminoxane as a catalyst), and polycyclohexylenedimethylene terephthalate (typically formed via formed from the polycondensation of terephthalic acid and cyclohexylenedimethanol).

In other embodiments, the polyester is an aromatic polyester such as Vectran™ (typically formed via polycondensation of 4-hydroxybenzoic acid and 6-hydroxynaphthalene-2-carboxylic acid).

In preferred embodiments, the polyester is a semi-aromatic polyester. Examples of suitable aliphatic polyesters include, but are not limited to, copolymers such as polyethylene terephthalate (typically formed via polycondensation of terephthalic acid with ethylene glycol), polybutylene terephthalate (typically formed via polycondensation of terephthalic acid with 1,4-butanediol), polytrimethylene terephthalate (typically formed via, polycondensation of terephthalic acid with 1,3-propanediol), and polyethylene naphthalate (typically formed via polycondensation of at least one naphthalene dicarboxylic acid with ethylene glycol).

In some specific embodiments, the polyester can be selected from a polyalkylene terephthalate such as polyethylene terephthalate, polybutylene terephthalate, polytrimethylene terephthalate, polyethylene naphthalate, polyethylene adipate, polyhydroxylalkanoate, polyhydroxyl butyrate, poly(3-hydroxybutyrate-co-3-hydroxyvalerate), polyglycolide, polylactic acid, the polycondensation product of 4-hydroxybenzoic acid and 6-hydroxynaphthalene-2-carboxylic acid, and polycaprolactone. In one particular embodiment, the polymer 22 is further defined as a semicrystalline thermoplastic polyester including, but not limited to, polyethylene terephthalate, polybutylene terephthalate, polytrimethylene terephthalate, polyethylene terephthalate-co-isophthalate, and combinations thereof. In one preferred embodiment, the polymer 22 is polybutylene terephthalate. In another preferred embodiment, the polymer 22 is polyethylene naphthalate.

In various embodiments, the polyester has a weight average molecular weight of greater than about 10,000, or greater than about 25,000, or from about 10,000 to about 1,000,000, or from about 50,000 to about 750,000, or from about 25,000 to about 500,000, g/mol. In additional non-limiting embodiments, all values and ranges of values, both whole and fractional, within one or more of the aforementioned ranges, are hereby expressly contemplated.

In some embodiments, the fiber 12 is further defined as comprising from about 2 to about 8, or from about 2 to about 4, ends or strands. As is known in the art, an "end" is a single strand comprising one or more filaments. In some embodiments, the fiber 12 is bulk continuous filament or staple. In some embodiments, the fiber 12 can be drawn or nonwoven. In other embodiments, the fiber 12 is woven or braided. The yarn can comprise ends of one material (e.g. just polyamide ends) or ends of more than one material (e.g. both polyamide and polyester ends). To this end, the fiber 12 can be mono-end, multi-end, or staple yarn.

Figure 2:
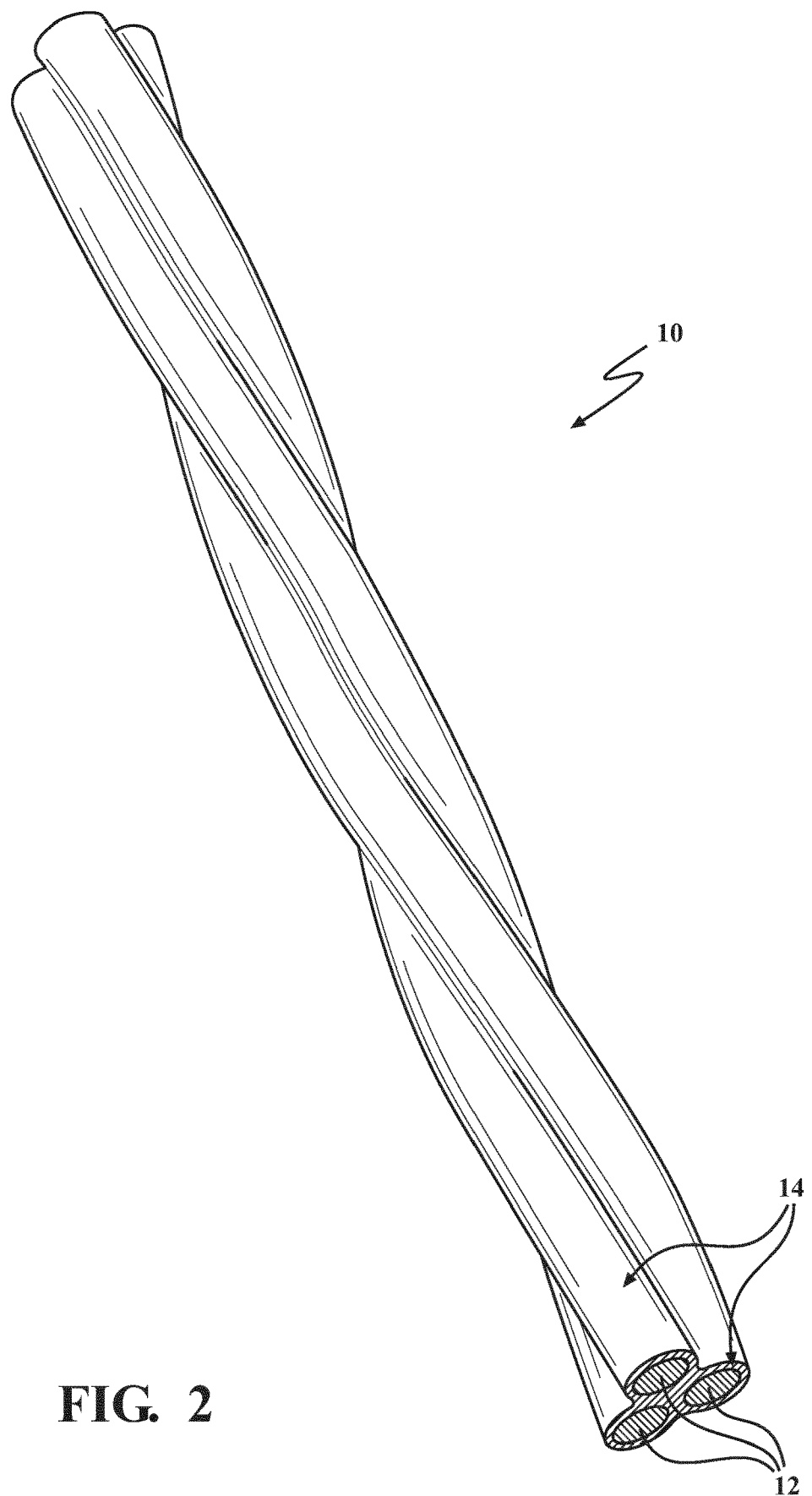
FIG. 2 is an enlarged perspective cross-sectional view of a coated fiber comprising 3 stands.
Figure 3:
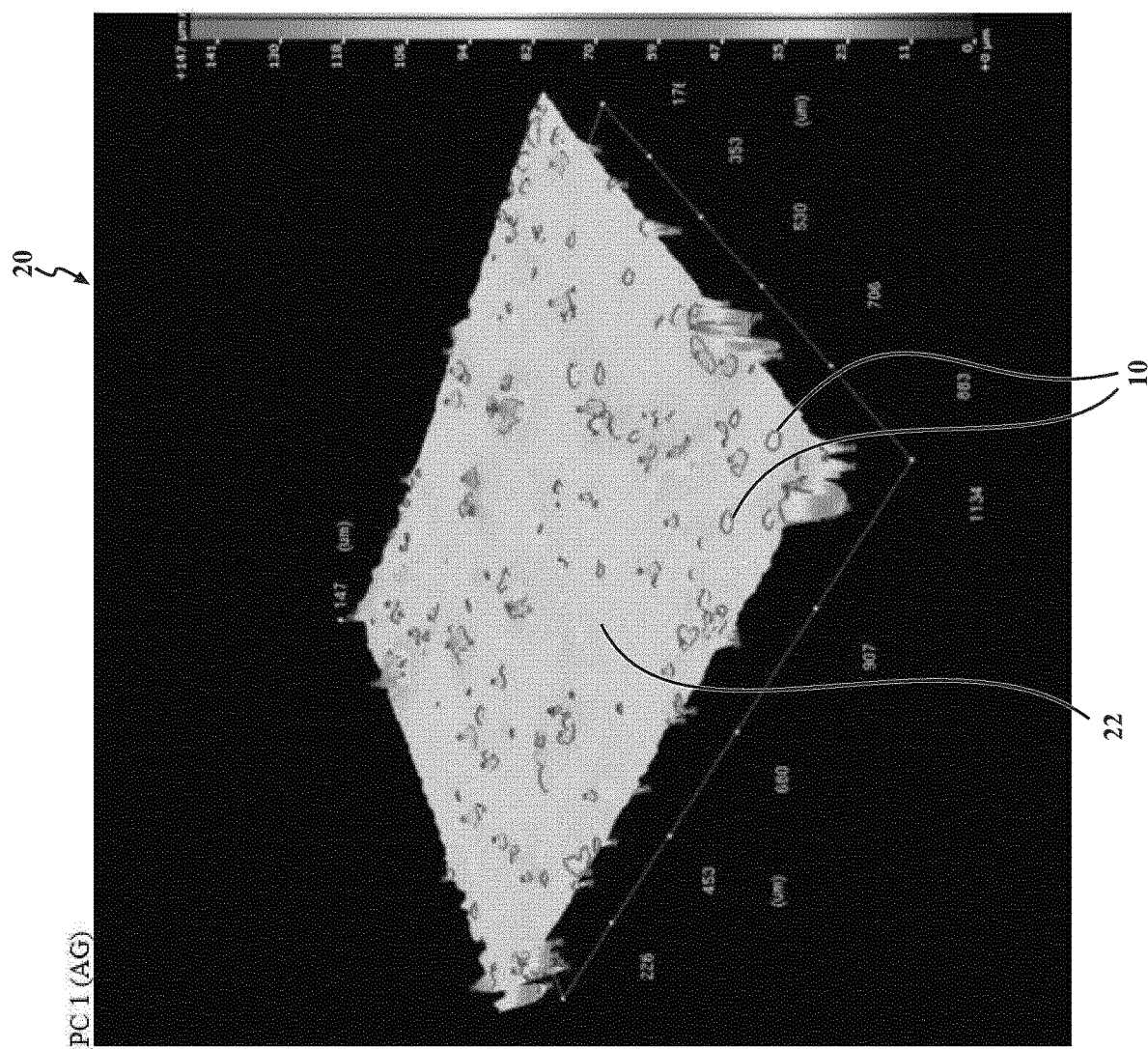
FIG. 3 is a surface topography image of Example Polymeric Composite 1 (which comprises the coated fiber of Example 1) taken against the machine direction on a Nanotronics nSpec 3D.
Figure 4:
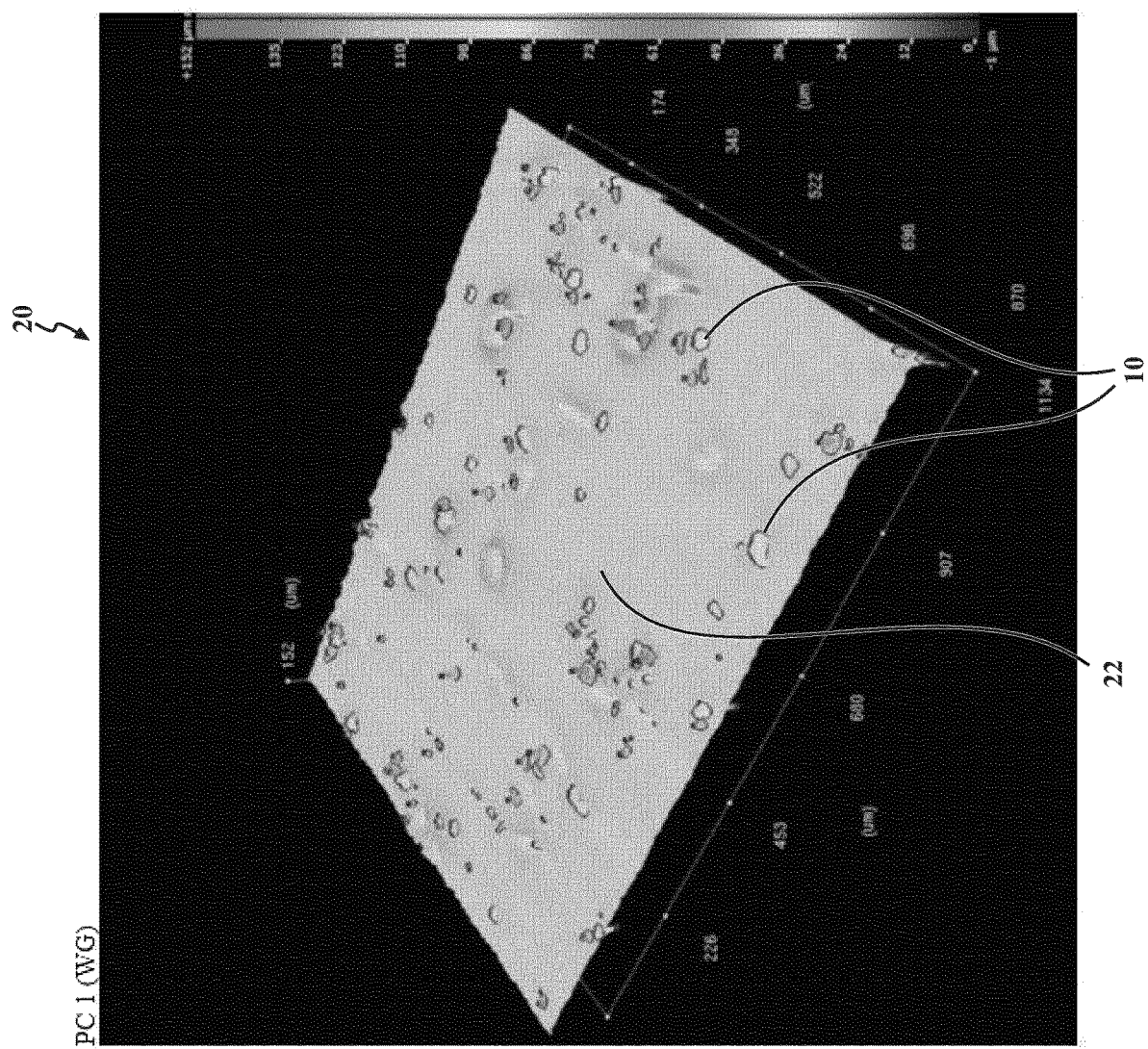
FIG. 4 is another surface topography image of Example Polymeric Composite 1 (which comprises the coated fiber of Example 1) taken with the machine direction on a Nanotronics nSpec 3D.
Figure 5:
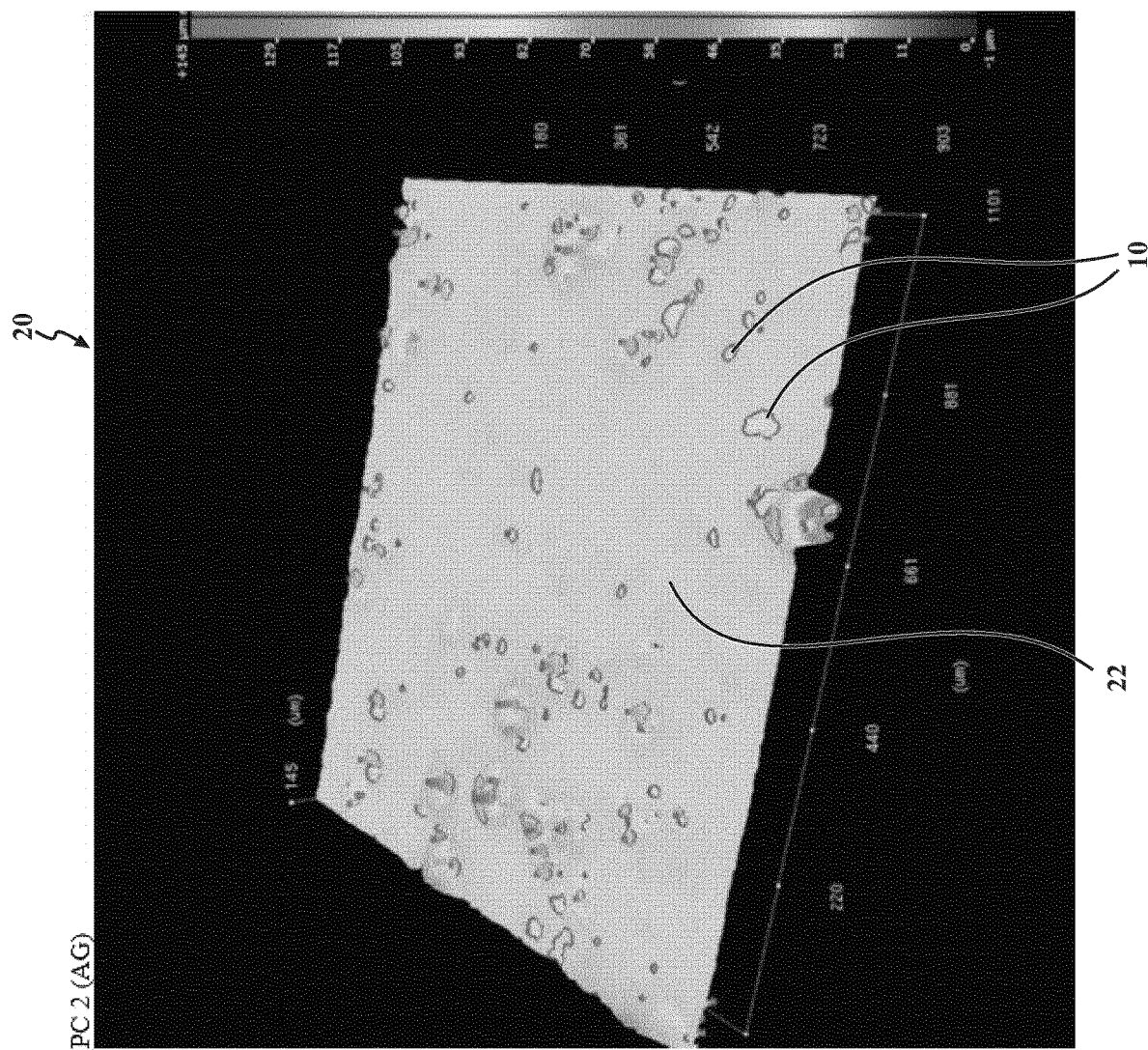
FIG. 5 is a surface topography image of Example Polymeric Composite 2 (which comprises the coated fiber of Example 2) taken against the machine direction on a Nanotronics nSpec 3D.
Figure 6:
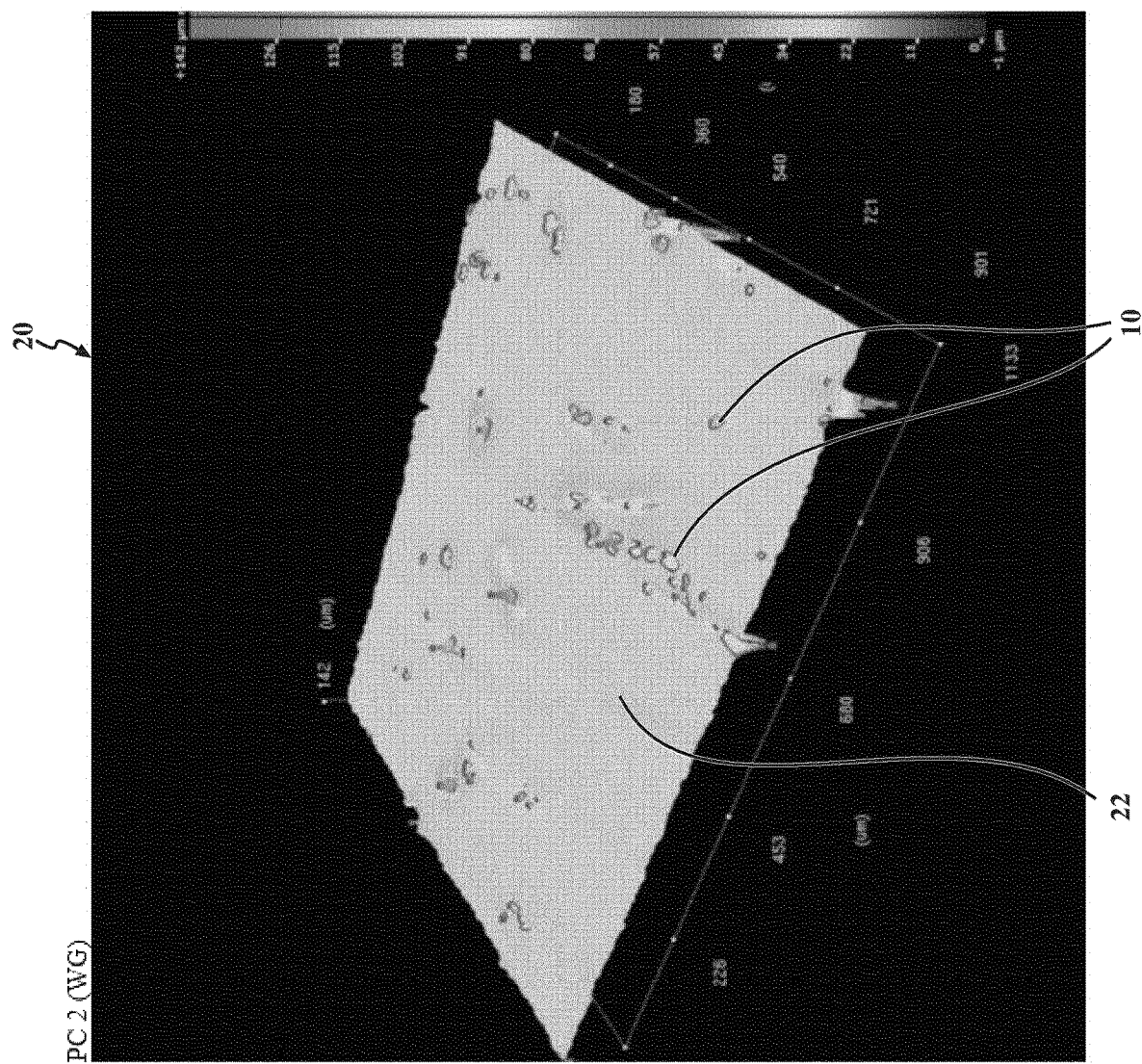
FIG. 6 is another surface topography image of Example Polymeric Composite 1 (which comprises the coated fiber of Example 2) taken with the machine direction on a Nanotronics nSpec 3D.
Figure 7:
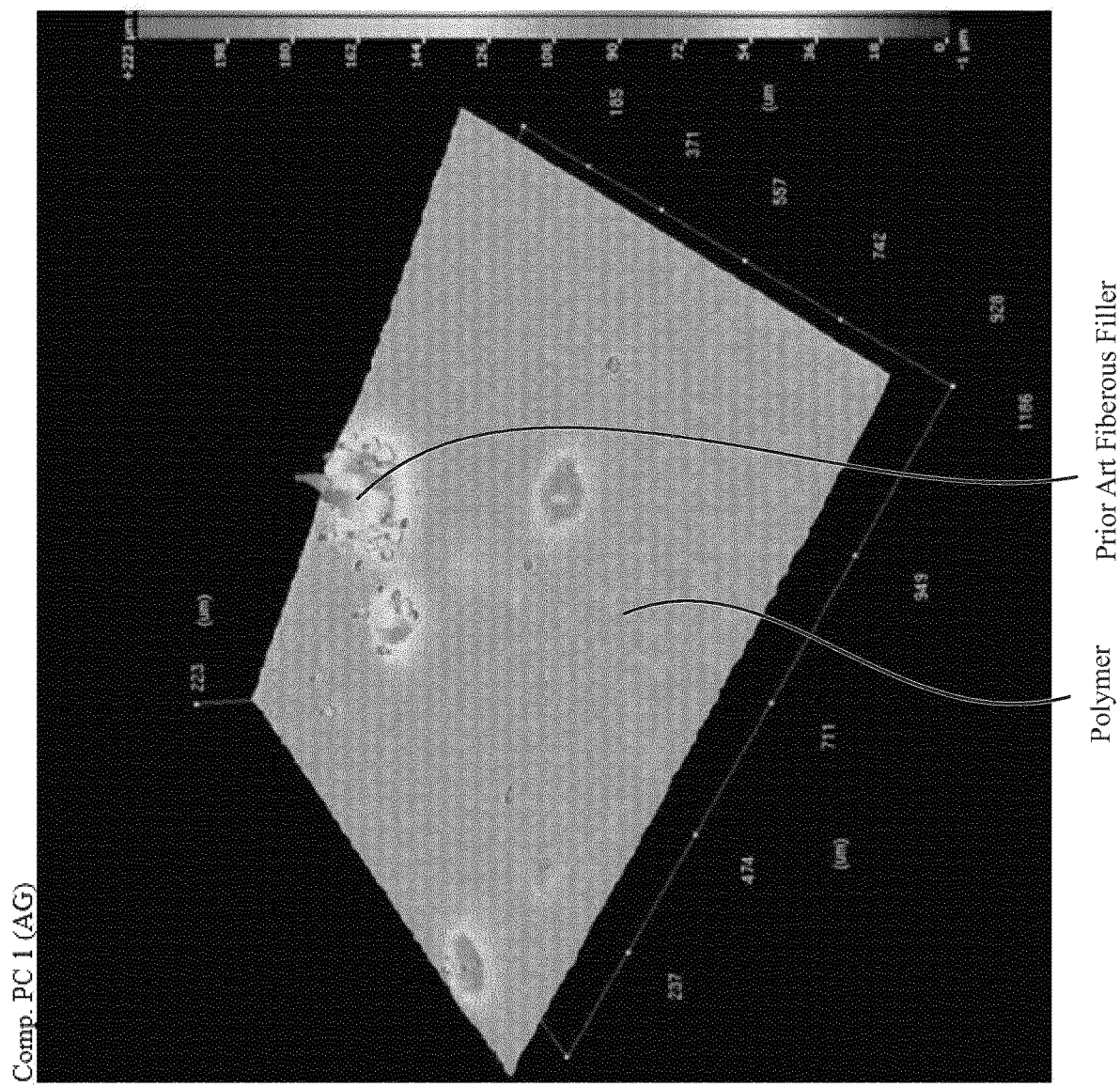
FIG. 7 is a surface topography image of prior art Comparative Example Polymeric Composite 1 (which comprises the coated fiber of Comparative Example 1) taken against the machine direction on a Nanotronics nSpec 3D.
Figure 8:
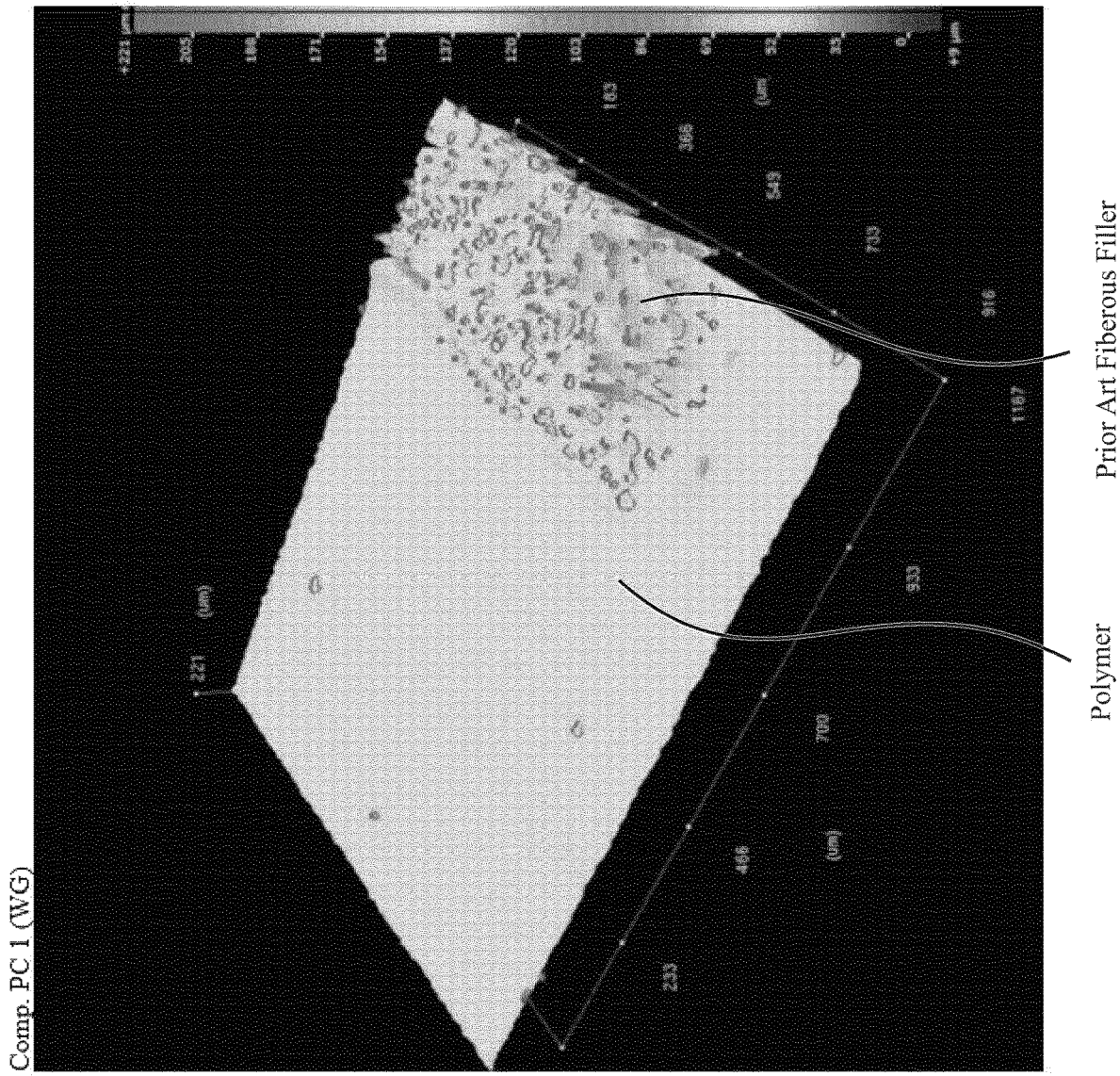
FIG. 8 is another surface topography image of prior art Comparative Example Polymeric Composite 1 (which comprises the coated fiber of Comparative Example 1) taken with the machine direction on a Nanotronics nSpec 3D.
Figure 9:
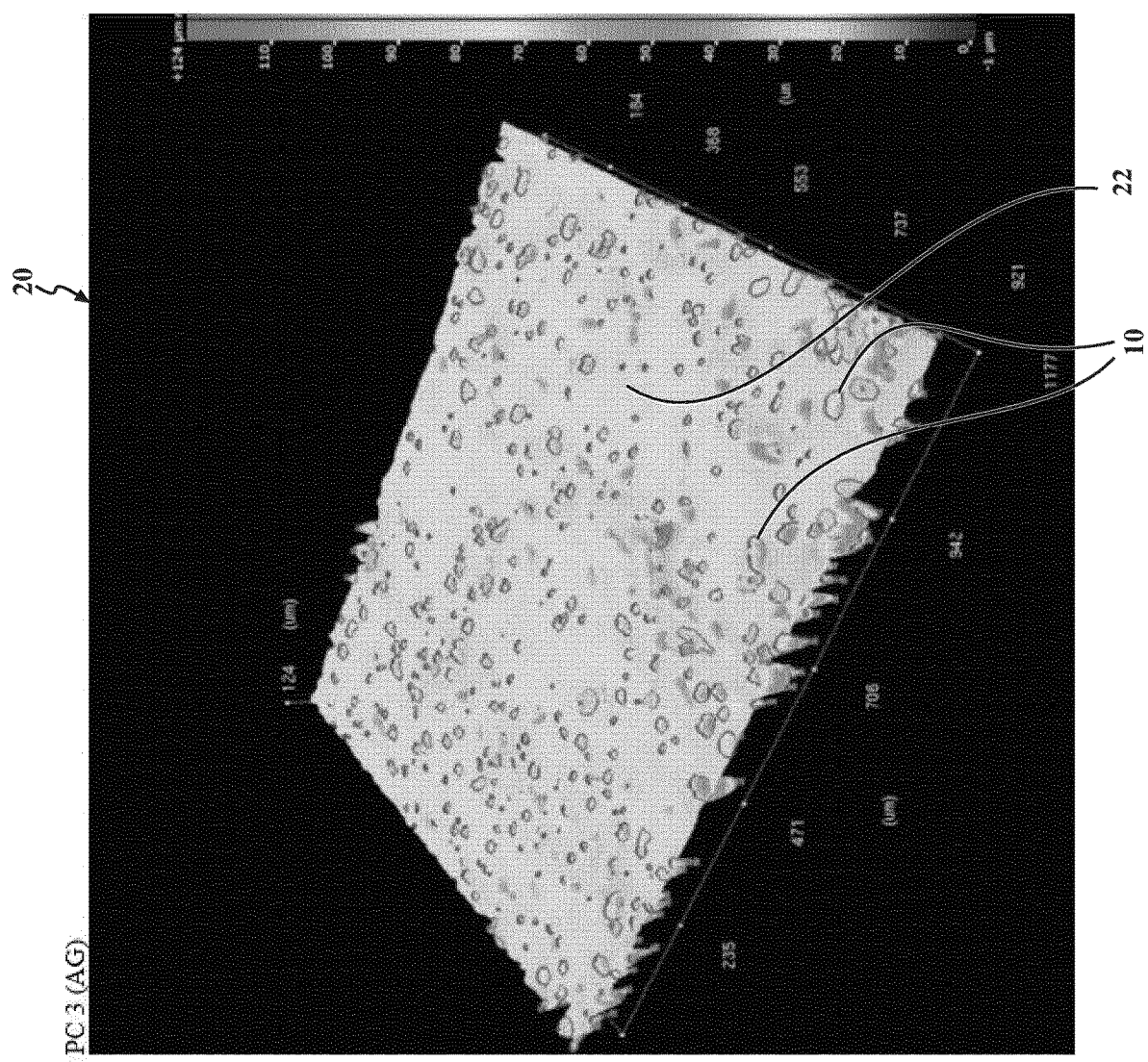
FIG. 9 is a surface topography image of Example Polymeric Composite 3 (which comprises the coated fiber of Example 3) taken against the machine direction on a Nanotronics nSpec 3D.
Figure 10:
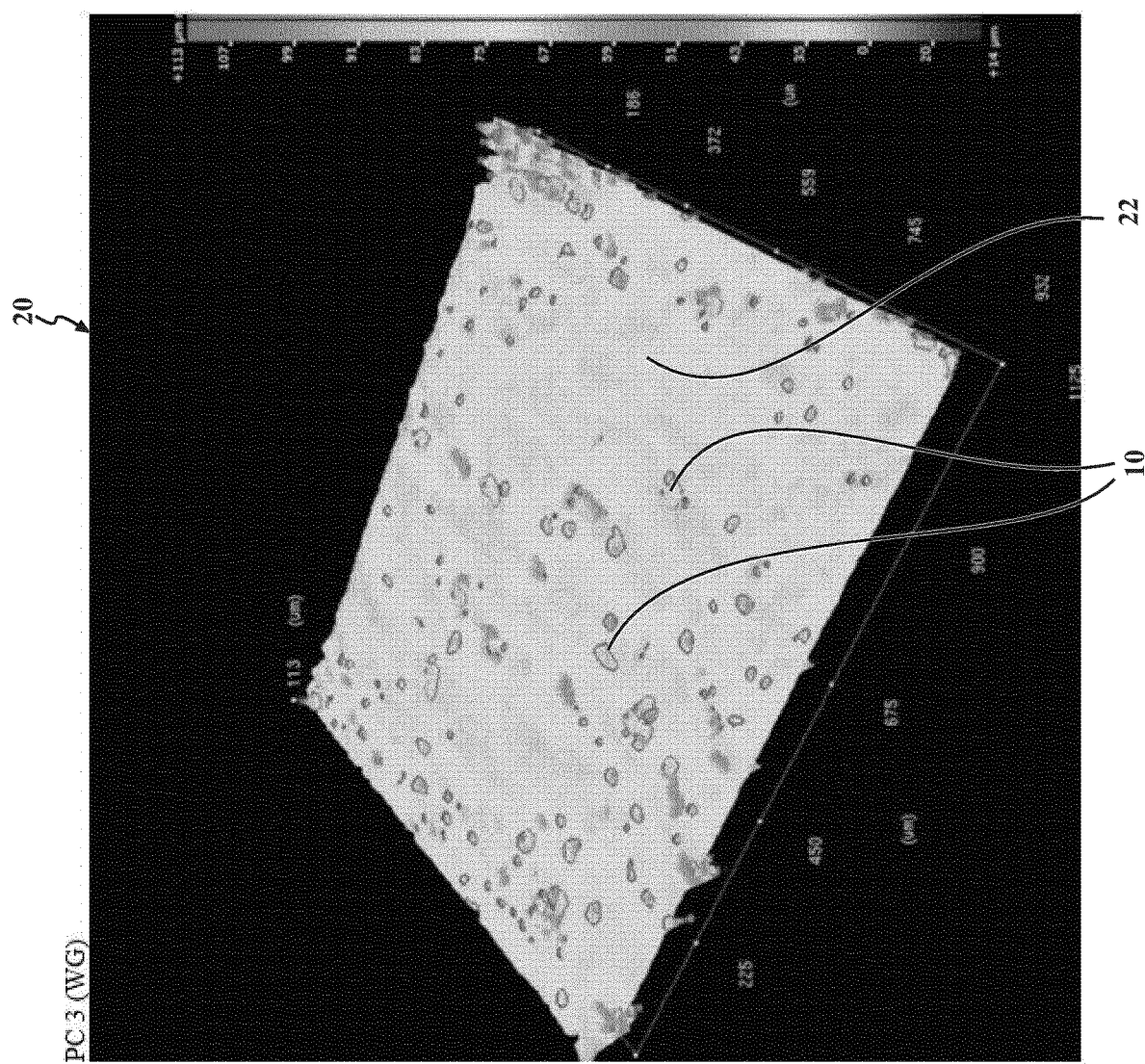
FIG. 10 is another surface topography image of Example Polymeric Composite 3 (which comprises the coated fiber of Example 3) taken with the machine direction on a Nanotronics nSpec 3D.
Figure 11:
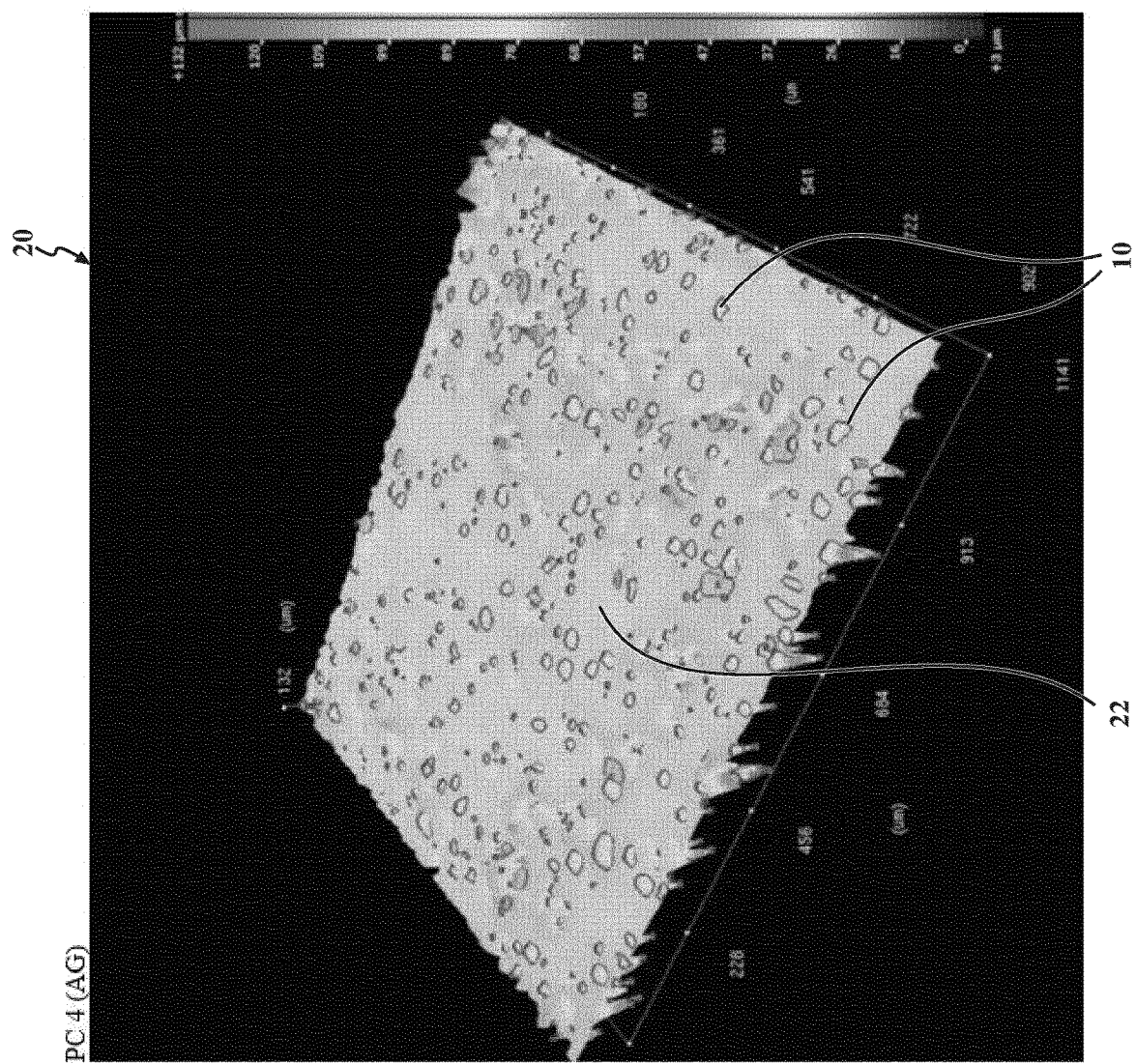
FIG. 11 is a surface topography image of Example Polymeric Composite 4 (which comprises the coated fiber of Example 4) taken against the machine direction on a Nanotronics nSpec 3D.
Figure 12:
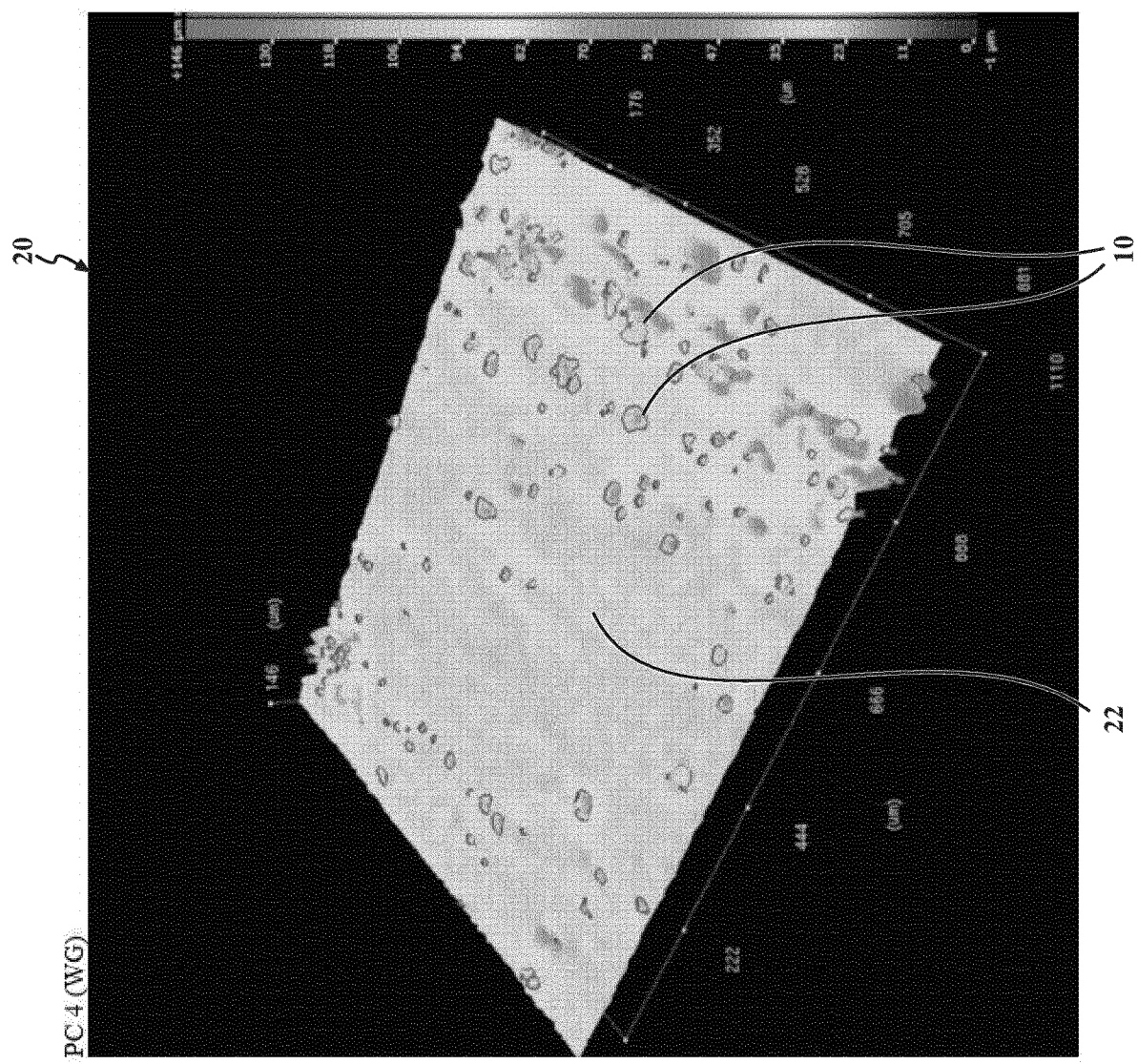
FIG. 12 is another surface topography image of Example Polymeric Composite 4 (which comprises the coated fiber of Example 4) taken with the machine direction on a Nanotronics nSpec 3D.
Figure 13:
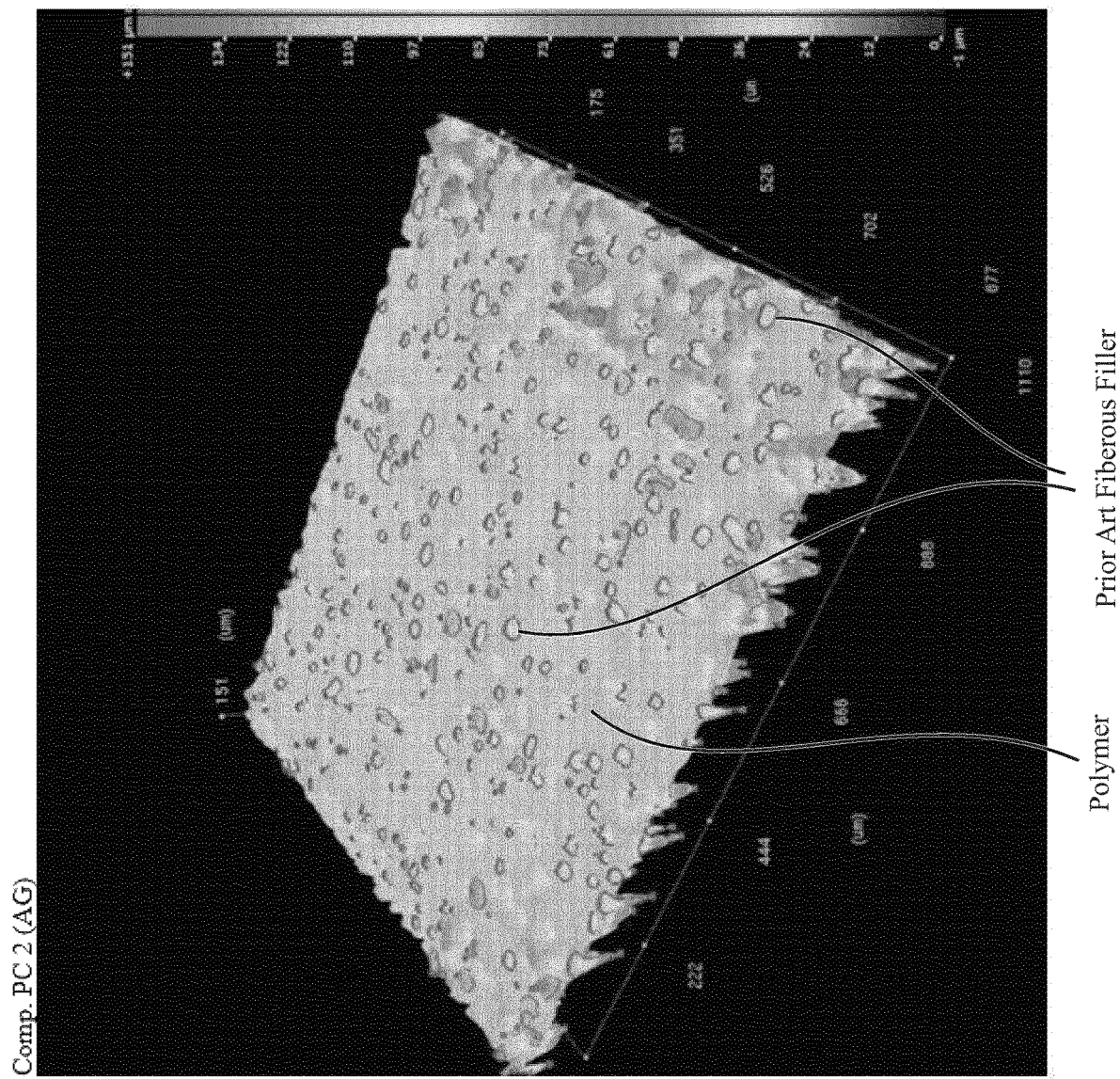
FIG. 13 is a surface topography image of prior art Comparative Example Polymeric Composite 2 (which comprises the coated fiber of Comparative Example 2) taken against the machine direction on a Nanotronics nSpec 3D.
Figure 14:
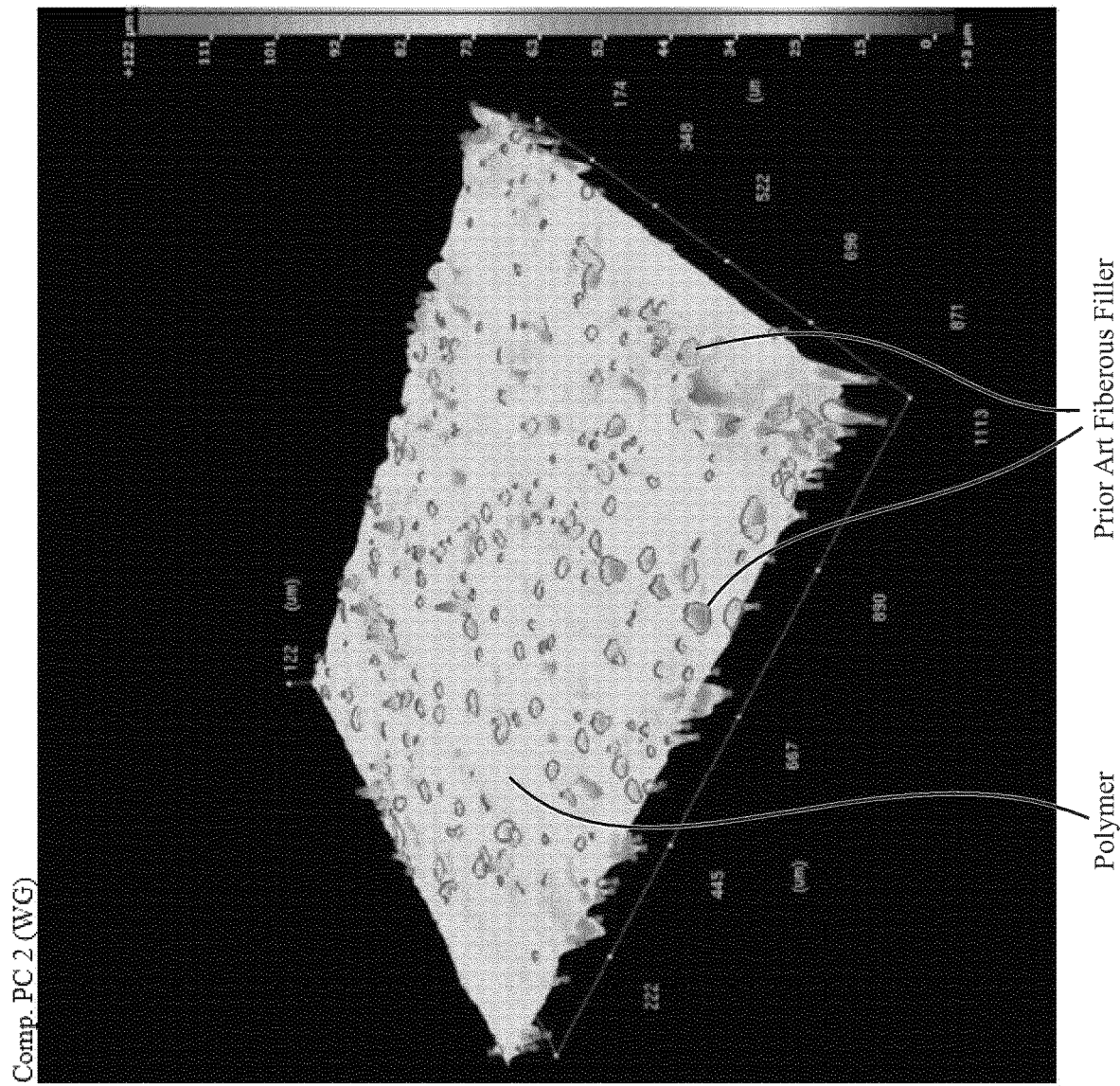
FIG. 14 is another surface topography image of prior art Comparative Example Polymeric Composite 2 (which comprises the coated fiber of Comparative Example 2) taken with the machine direction on a Nanotronics nSpec 3D.

Referring now to FIGS. 1 and 2, FIG. 1 is an enlarged cross-sectional view of a coated fiber 10 comprising a single strand and FIG. 2 is an enlarged cross-sectional view of a coated fiber 10 comprising 3 strands. Of course, these figures are exemplary in nature and the coated fiber 10 can comprise 1, 2, 3, 4, 5, 6, 7, 8, 9, or more ends or strands. Further, although the fibers 12 shown in FIGS. 1 and 2 have a round cross-sectional profile, it is to be appreciated that the fibers 12 can have cross-sectional profiles of various shapes, such as round, ovular, triangular, rectangular, square, 5 sided, 6-sided, bell-shaped, star-shaped, bi-lobal, tri-lobal, flattened, etc. In some embodiments, the fibers are hollow.

In many embodiments, the fiber 12 has: a denier of from about 250 to about 3,000, from about 1,000 to about 2,500, or from about 1,400 to about 2,100; and/or a diameter of from about 0.1 to about 15, from about 0.3 to about 7.5, or from about 0.5 to about 3, μm. As defined herein, denier is the mass in grams per 9,000 meters of the fiber 12. In additional non-limiting embodiments, all values and ranges of values, both whole and fractional, within one or more of the aforementioned ranges, are hereby expressly contemplated.

In many embodiments, the fiber 12 is present in the coated fiber 10 in an amount of from about 80 to about 99.8, about 90 to about 99.8, about 90 to about 99, about 92 to about 99, or about 93 to about 97, percent by weight based on the total weight of the coated fiber 10. In additional non-limiting embodiments, all values and ranges of values, both whole and fractional, within one or more of the aforementioned ranges, are hereby expressly contemplated.

The Coating

As is set forth above, the coated fiber 10 comprises the coating 14, which is disposed about the fiber 12. The coating 14 comprises a polyethylene imine (PEI).

The PEI can be made by various methods understood in the art. For example, the PEI can be made by ring opening of aziridine by acid catalyzed polymerization. In certain embodiments, the PEI can be further modified, such as by amidation with fatty acids, by alkoxylation with alkylene oxides, or by carboxylation with acrylic acid and/or maleic acid.

In many embodiments, the PEI has a weight average molecular weight ($M_w$) of from about 300 to about 2,000,000, about 400 to about 1,000,000, about 500 to about 900,000, about 800 to about 800,000, about 800 to about 25,000, g/mol.

In various embodiments, the PEI is a branched polymer comprising groups such as:

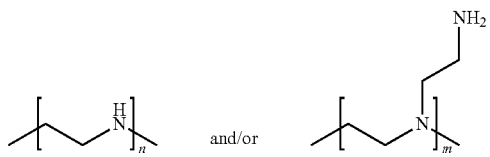

wherein n is about 18 to about 50,000 such that the PEI has a weight average molecular weight of about 800 to about 2,000,000 g/mol. It is also contemplated that the PEI may have any value or range of values, both whole and fractional, within those ranges described above. In still other embodiments, the PEI is a branched polymer having the following exemplary structure:

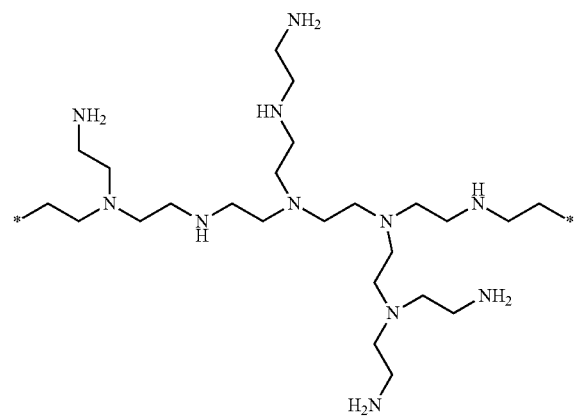

Still referring to the exemplary structure above, the branched structure of the PEI provides primary, secondary, and tertiary amines. That is, the PEI typically includes linear (L), dendric (D), and terminal groups (T).

In some embodiments, the branched polyethylene imine comprises: from about 20 to about 55, or from about 30 to about 45, percent linear groups (L); from about 10 to about 40, or from about 20 to about 30, dendric groups (D); and from about 20 to about 55, or from about 30 to about 45, percent terminal groups (T), based on 100 percent of all groups present in said branched polyethylene imine as determined via $^{13}$C-NMR in $D_2O$. In additional non-limiting embodiments, all values and ranges of values, both whole and fractional, within one or more of the aforementioned ranges, are hereby expressly contemplated.

In many embodiments, the branched polyethylene imine has a degree of branching (DB) of from about 0.30 to about 0.85, from about 0.40 to about 0.75, or about 0.60 to about 0.70, as determined via $^{13}$C-NMR in $D_2O$ and calculated with the Fréchet equation (DB=(D+T)/(D+L+T)). In additional non-limiting embodiments, all values and ranges of values, both whole and fractional, within one or more of the aforementioned ranges, are hereby expressly contemplated.

As is shown above, the branched structure of the PEI includes primary, secondary and tertiary amines. Table 1 below sets forth four exemplary embodiments of PEI that can be included in a coating composition and used to form the coating 14. The PEI embodiments set forth in Table 1 are non-limiting embodiments and, thus, other PEI embodiments of alkyl amine with different physical characteristics are also contemplated.

TABLE 1

| Physical Characteristics | Non-Limiting Embodiment 1 of PEI | Non-Limiting Embodiment 2 of PEI | Non-Limiting Embodiment 3 of PEI | Non-Limiting Embodiment 4 of PEI |
|---|---|---|---|---|
| Appearance | Liquid | Liquid | Liquid | Liquid |
| Approx. Viscosity at 20° C. (mPa · s) | 2,000 | 3,000 | 18,000 | 100,000 |
| Approx. Concentration in Water (wt %) | >98 | >98 | ~50 | >99 |
| Approx. Water Content (wt %) | ~2 | ~2 | ~50 | ~1 |
| Approx. Pour Point (° C.) | −18 | −18 | −3 | −1 |
| Approx. Boiling Point (° C.) | >>200 | >>200 | 100 | >>200 |
| Approx. Flame Point (° C.) | >100 | >100 | >100 | >100 |
| Approx. Density at 20° C. (g/cm$^3$) | 1.03 | 1.03 | 1.09 | 1.10 |
| Approx. pH value (1% in Water) | 10-12 | 10-12 | 10-12 | 10-12 |
| Approx. pKa Value | 7-10 | 7-10 | 7-10 | 7-10 |
| Approx. Charge Density | 16 | 16 | 20 | 17 |
| Approx. Weight Average Molecular Weight ($M_w$) (g/mol) | 800 | 1,300 | 750,000 | 25,000 |
| Approx. Ratio of 1°:2°:3° Amines | 1:0.82:0.53 | 1:0.91:0.64 | 1:1.07:0.77 | 1:1.2:0.76 |

Of course, the coating composition may include water. When the water evaporates from the coating composition, the coating 14 is formed. This water may be the same as, or independent from, the water described immediately above which is mixed with the PEI. The water can be of various types. In certain embodiments, the water is de-mineralized and/or de-ionized. The water is present in the coating composition in various amounts, depending on the embodiment. The water can be added to the coating composition as a separate component.

Suitable PEI's are commercially available from BASF Corporation under the trade name of LUPASOL®.

In many embodiments, the PEI is present in the coating 14 in an amount of from about 80 to about 100, about 90 to about 99.5, or about 92 to about 99, percent by weight based on the total weight of the coating 14. Further, it is to be appreciated that more than one type of PEI may be included in the coating 14 (e.g. two different molecular weight PEI's), in which case the total amount of all PEI present in the coating 14 is within the above ranges. In additional non-limiting embodiments, all values and ranges of values, both whole and fractional, within one or more of the aforementioned ranges, are hereby expressly contemplated.

The coating 14 may also include one or more surfactants. The surfactant is included to improve the wetting and/or lower the surface tension of the coating composition. If employed, the surfactant is typically selected from the group of nonionic surfactants, anionic surfactants, cationic surfactants, amphoteric surfactants, and combinations thereof. In certain embodiments, the surfactant is selected from the group of polyalkyleneoxide, alkylpolyalkyleneoxide, polyoxyethylene sorbitan monolaurate, alkylpolyglucosides, anionic derivatives of alkylpolyglucosides, fatty alcohols, anionic derivatives of fatty alcohols, and phosphate esters.

In various embodiments, the coating 14 includes a non-ionic surfactant. Non-ionic surfactants, suitable for purposes of the present disclosure, include alcohol alkoxylates, e.g. polyalkyleneoxides. Suitable alcohol alkoxylates include linear alcohol ethoxylates. Additional alcohol alkoxylates include alkylphenol ethoxylates, branched alcohol ethoxylates, secondary alcohol ethoxylates, castor oil ethoxylates, alkylamine ethoxylates (also known as alkoxylated alkyl amines), tallow amine ethoxylates, fatty acid ethoxylates, sorbital oleate ethoxylates, end-capped ethoxylates, or combinations thereof. Further non-ionic surfactants include amides such as fatty alkanolamides, alkyldiethanolamides, coconut diethanolamide, lauramide diethanolamide, cocoamide diethanolamide, polyethylene glycol cocoamide, oleic diethanolamide, or combinations thereof. Yet further non-ionic surfactants include polyalkoxylated aliphatic base, polyalkoxylated amide, glycol esters, glycerol esters, amine oxides, phosphate esters, alcohol phosphate, fatty triglycerides, fatty triglyceride esters, alkyl ether phosphate, alkyl esters, alkyl phenol ethoxylate phosphate esters, alkyl polysaccharides, block copolymers, alkyl polyglucocides, or combinations thereof. Suitable non-ionic surfactants are commercially available from BASF Corporation under the trade names of PLURAFAC®, PLURONIC®, TETRONIC®, and LUTENSOL®.

In various embodiments, the coating 14 includes an amphoteric surfactant. Amphoteric surfactants, suitable for purposes of the present disclosure, include betaines, imidazolines, and propionates. Further examples of suitable amphoteric surfactants include sultaines, amphopropionates, amphrodipropionates, aminopropionates, aminodipropionates, amphoacetates, amphodiacetates, and amphohydroxypropylsulfonates. In certain embodiments, the amphoteric surfactant is at least one of a propionate or an amphodiacetate. Further specific examples of suitable amphoteric surfactants include N-acylamino acids such as N-alkylaminoacetates and disodium cocoamphodiacetate, and amine oxides such as stearamine oxide. In one embodiment, the amphoteric surfactant comprises disodium cocoamphodiacetate.

In certain embodiments, the amphoteric surfactant is illustrated by the formulas: $RCH_2NHCH_2CH_2COOM$ or $RCH_2N(CH_2CH_2COOM)_2$, wherein M is a salt-forming cation (e.g. Na or H) and R is the hydrocarbon moiety of the long-chain fatty acid RCOOH, e.g. a $C_7$ to $C_{35}$, or a $C_7$ to $C_{18}$, fatty acid. Such amphoteric surfactants include sodium N-coco-β-aminopropionate, N-coco-β amino propionic acid; N-lauryl, myristyl-β-amino propionic acid; disodium N-tallow-β-iminopropionate; disodium N-lauryl-β-iminopropionate (also known as sodium lauriminodipropionate); and the partial sodium salt of N-lauryl-β-iminopropionic acid. In one embodiment, the amphoteric surfactant comprises sodium lauriminodipropionate. Suitable amphoteric surfactants are commercially available from BASF Corporation, under the trade names of DERIPHAT®, MAFO®, and DEHYTON®.

In many embodiments, the surfactant(s) is present in the coating 14 in an amount of from about 0.1 to about 9, about 0.2 to about 6, or about 0.3 to about 3, percent by weight based on the total weight of the coating 14. Further, it is to be appreciated that more than one type of surfactant may be included in the coating 14 (e.g. both a polyalkyleneoxide and a fatty alcohol), in which case the total amount of all surfactant present in the coating 14 is within the above ranges. In additional non-limiting embodiments, all values and ranges of values, both whole and fractional, within one or more of the aforementioned ranges, are hereby expressly contemplated.

In certain embodiments, the coating 14 further comprises one or more additives. Various types of additives can be used. Examples of suitable additives include antioxidants, chelants, colorants, dispersants, stabilizers, viscosity modifiers, fillers, crosslinkers/curatives, catalysts, blowing agents, and combinations thereof. If utilized, the additive(s) may be used in various amounts.

In some embodiments, the coating 14 further comprises a resorcinol-formaldehyde-latex (RFL) and/or isocyanate. In certain embodiments, the coating 14 is substantially free of resorcinol-formaldehyde-latex and/or isocyanate. The terminology "substantially free," as used immediately above, refers to an amount of less than about 5, less than about 1, less than about 0.1, percent by weight based on the total weight of the coating 14 present in the coated fiber 10.

In some embodiments, the coating 14 consists essentially of the branched PEI and the surfactant. As used herein, "consisting essentially of" is meant to exclude any element or combination of elements, as well as any amount of any element or combination of elements, that would alter the basic and novel characteristics of the polyamide composition.

In other embodiments, the coating 14 is substantially free from other polymers known in the art (including elastomers), fillers known in the art (including reinforcing fillers), and/or plasticizers known in the art. The terminology "substantially free," as used immediately above, refers to an amount of less than about 5, less than about 1, less than about 0.1, or about 0, percent by weight based on the total weight of the coating 14 present in the coated fiber 10.

In many embodiments, the coating 14 is present in the coated fiber 10 in an amount of from about 0.2 to about 10, about 1 to about 8, or about 3 to about 6, percent by weight based on the total weight of the coated fiber 10. In additional non-limiting embodiments, all values and ranges of values, both whole and fractional, within one or more of the aforementioned ranges, are hereby expressly contemplated.

Other Adhesives and Components

In some embodiments, the coated fiber 10 comprises additional adhesive components. The adhesive component can be included in the coating 14 or applied separately to the coated fiber 10 (e.g. as an additional layer between the fiber 12 and the coating 14 or as an additional layer on top of the coating 14). Suitable non-limiting examples of suitable adhesives comprise polymers such as ethylene vinyl acetate copolymers, ethylene acrylate copolymers, (meth)acrylates, polyolefins (e.g. polyethylene (HDPE, LDPE, etc.), polypropylene, polybutene-1, oxidized polyethylene, polybutene, amorphous polyolefins (amorphous propylene, amorphous propylene/ethylene, amorphous propylene/butene, amorphous propylene/hexene, amorphous propylene/ethylene/butene, etc.), chlorinated polyolefins (chlorinated polypropylene), maleic anhydride modified polyolefins), polyamides and polyesters, polyesters, polyurethanes (TPU, PUR, etc.), styrene block copolymers (styrene-butadiene-styrene, styrene-isoprene-styrene, styrene-ethylene/butylene-styrene, styreneethylene/propylene), polycaprolactone, polycarbonates, fluoropolymers, silicones, thermoplastic elastomers, rubbers (natural rubber, polybutadiene, styrene butadiene rubber, butyl rubber, EPDM rubber), polypyrrole, resorcinol formaldehyde, isocyanate (e.g. PMDI), and other polymers and copolymers, and combinations thereof.

In some embodiments, the adhesive component comprises or is a resorcinol-formaldehyde-latex (RFL) adhesive. In an RFL adhesive, the resorcinol reacts with formaldehyde to produce a resorcinol-formaldehyde reaction product. This reaction product is the result of a condensation reaction between a phenol group on the resorcinol and the aldehyde group on the formaldehyde. Resorcinol resoles and resorcinol-phenol resoles, whether formed in situ within the latex or formed separately in aqueous solution, are typically included in the RFL adhesive/adhesive layer to facilitate rubber adhesion of further layers/components.

In some such embodiments, the RFL adhesive comprises a resorcinol formaldehyde resin, a styrene-butadiene copolymer latex, a vinylpyridine-styrene-butadiene terpolymer latex, and a blocked isocyanate. In other embodiments, the RFL adhesive comprises a resorcinol, formaldehyde, a styrene-butadiene rubber latex, a vinylpyridine-styrene-butadiene terpolymer latex, and a blocked isocyanate.

In some particular embodiments, the coated fiber 10 comprises a supplementary coating comprising an RFL adhesive. The supplementary coating can be disposed between the fiber 12 and the coating 14 (e.g. about an outer peripheral surface of the fiber 12 and an inner peripheral surface of the coating 14) or can be disposed about an outer peripheral surface of the coating 14, i.e. as an outer coating.

In some embodiments, the adhesive component comprises or is an isocyanate. In some such embodiments, the isocyanate includes, but is not limited to, isocyanates, diisocyanates, polyisocyanates, and combinations thereof. The isocyanate component can include one or more different isocyanates. In one embodiment, the isocyanate component includes an n-functional isocyanate. In this embodiment, n is a number from about 2 to about 5, about 2 to about 4, about 2 to about 3, or about 2. It is to be understood that n may be an integer or may have intermediate values from about 2 to about 5. The isocyanate typically includes an isocyanate selected from the group of aromatic isocyanates, aliphatic isocyanates, and combinations thereof. In another embodiment, the isocyanate component includes an aliphatic isocyanate such as hexamethylene diisocyanate (HDI), dicyclohexylmethyl-diisocyanate (H12MDI), isophorondiisocyanate, and combinations thereof. If the isocyanate component includes an aliphatic isocyanate, the isocyanate component may also include a modified multivalent aliphatic isocyanate, i.e., a product which is obtained through chemical reactions of aliphatic diisocyanates and/or aliphatic polyisocyanates. Examples include, but are not limited to, ureas, biurets, allophanates, carbodiimides, uretonimines, isocyanurates, urethane groups, dimers, trimers, and combinations thereof. The isocyanate may also include, but is not limited to, modified diisocyanates employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof. The isocyanate may also be an isocyanate prepolymer.

In many embodiments, the coated fiber 10 is free of or substantially free from adhesive components known in the art. The terminology "substantially free," as used immediately above, refers to an amount of less than about 5, less than about 1, less than about 0.1, or about 0, percent by weight adhesive component based on the total weight of the coated fiber 10.

The Method of Producing the Coated Fiber

The instant disclosure also provides a method of producing the coated fiber 10. The method comprises the steps of providing the fiber 12, providing the coating composition, and applying the coating composition to the fiber 12 to form the coated fiber 10. The fiber 12, the coating 14, and the coated fiber 10 are just as described above.

In many embodiments, the coated fiber 10 is a yarn comprising two or more ends. As such, in some embodiments of the method, the method includes the step of braiding one or more ends on braiding equipment with from about 1 to about 12 carriers/bobbins. The braids can comprise any combination of ends. In some such embodiments, the step of applying is conducted in-line with the step of applying the coating composition.

The method also comprises the step of applying the coating composition to the fiber 12 to form the coated fiber 10. Of course, the coating composition may include water and/or curatives. When the water evaporates and/or the curatives cure the PEI, the coating 14 is formed. The step of applying the coating composition to the fiber 12 to form the coated fiber 10 is typically conducted via spraying, brushing, immersion, or other methods known in the art. In a preferred embodiment, the step of applying is conducted via immersion. In various embodiments, the step of applying is conducted in less than about 10, about 9, about 8, about 7, about 6, about 5, about 4, about 3, about 2, or about 1, seconds.

In one particular embodiment, the coated fiber 10 comprises, consists essentially of, or consists of the fiber 12 and the coating 14 and the method includes a single application of the coating composition, i.e. a single layer of coating. Methods of the prior art often utilize multiple adhesive components (e.g. isocyanate and RFL) and, thus, require multiple applications of coatings since multiple adhesive components are required and since the adhesive components may react with one another (e.g. isocyanate react with RFL). Advantageously, a single application of the coating composition of the subject application can be used in lieu of multiple applications of other coating compositions.

In some embodiments of the method, the fiber 12 has a surface energy of from about 30 to about 60 mJ/m$^2$ and the composition has a surface tension of from about 20 to about 65 J/m$^2$, which enables a single application step. The surface tension of the coating composition can be adjusted to facilitate the wetting of the particular fibers 12 (e.g. aramid vs. polyester) selected for incorporation in the coated fiber 10.

In some embodiments of the method, the coating composition (comprising PEI) is first applied to an outer peripheral surface of the fiber 12 and then the adhesive component comprising RFL is subsequently applied to the coating 14. In another embodiment of the method, the adhesive component comprising RFL is first applied to an outer peripheral surface of the fiber 12 and then the coating composition is subsequently applied to the adhesive component comprising RFL.

The method optionally includes the step of heating the fiber 12 having the coating composition thereon subsequent to the step of applying the coating composition. The step of heating is typically conducted subsequent to the step of applying. As such, the step of heating can be included in various embodiments of the method one or more times, i.e., the method can include one or more heating steps. In such embodiments, the fiber 12 having the coating composition thereon can be dried at any suitable drying temperature. In some embodiments, the fiber 12 having the coating composition thereon is heated to a temperature of from about 35 to about 250, about 50 to about 200, or about 75 to about 125, ° C.

The Polymeric Composite

Referring to the FIGS. 5-14, wherein like numerals indicate corresponding parts throughout the several views, the polymeric composite is generally shown at 20. The polymeric composite 20 includes the coated fiber 10 and a polymer 22.

The coated fiber 10 is just as described above and can be included in the polymeric composite 20 in an amount of from about 0.5 to about 65, about 1 to about 45, about 2 to about 25, about 2 to 15, or about 2 to about 10, percent by weight based on the total weight of the polymeric composite 20. In additional non-limiting embodiments, all values and ranges of values, both whole and fractional, within one or more of the aforementioned ranges, are hereby expressly contemplated.

The polymeric composite 20 comprises one or more of the polymer 22. The polymer 22 is selected from elastomers, thermoplastics, thermoplastic elastomers, and combinations thereof.

The polymer 22 can be a thermoplastic polymer or a thermosetting polymer. Thermoplastics have a relatively high molecular weight and molecular chains that associate through intermolecular forces, which weaken rapidly with increased temperature, and, thus, melt. As such, thermoplastics may be reshaped by heating and are typically used to produce parts by various polymer-processing techniques such as injection molding, compression molding, calendering, and extrusion. In contrast to thermoplastics, thermosets form irreversible chemical bonds when cured and, thus, do not melt, but decompose.

In many embodiments, the polymer 22 is a thermoplastic polymer (thermoplastic). The thermoplastic can be an amorphous or crystalline polymer. Generally, crystalline polymers have a relatively sharp melting point, have a more ordered arrangement of molecular chains, and require higher temperatures to flow well when compared to amorphous polymers. Generally, amorphous polymers have no true melting point and soften gradually, have a more random orientation of molecular chains, and do not flow as easily as amorphous polymers. In some embodiments, the thermoplastic composition includes a combination of crystalline and amorphous thermoplastic polymers. In other embodiments, the thermoplastic composition includes thermoplastic elastomers, which can include crystalline and amorphous segments.

Various non-limiting examples of suitable thermoplastics and thermoplastic elastomers include polyolefins (e.g. PP, PE, ethylene/hexane copolymer, ethylene/acrylic acid, etc.), polyolefin elastomers, polyvinylchlorides (PVC), polyamides (PA), styrenic elastomers, thermoplastic vulcanate elastomer (TPV), fluoropolymers (e.g. PTFE, perfluoroelastomer, etc.), silicones, polyesters, polyester elastomers, polyoxymethylenes (POM), thermoplastic polyurethanes (TPU), and combinations thereof. In some preferred embodiments, the polymer 22 is selected from thermoplastic polyurethane, polyoxymethylene, polyalkylene terephthalate, and combinations thereof.

In many preferred embodiments, the polymer is an elastomer (rubber). Various non-limiting examples of suitable elastomers include natural rubber (natural polyisoprene), synthetic polyisoprene, polybutadiene, chloroprene rubber, butyl rubber, halogenated butyl rubber, styrene-butadiene rubber, nitrile rubber, ethylene propylene rubber, ethylene propylene diene rubber (EPDM), epichlorohydrin rubber, polyacrylic rubber, silicone rubber, fluorosilicone rubber, fluoroelastomer, perfluoroelastomer, polyether block amides, chlorosulfonated polyethylene, and ethylene-vinyl acetate.

In many embodiments, the polymer 22 is included in the polymeric composite 20 in an amount of from about 5 to about 95, about 20 to about 90, about 30 to about 80, or about 40 to about 70, percent by weight based on the total weight of the polymeric composite 20. Further, it is to be appreciated that more than one type of polymer may be included in the polymeric composite 20 (e.g. two different polymers), in which case the total amount of all polymers present in the polymeric composite 20 is within the above ranges. In additional non-limiting embodiments, all values and ranges of values, both whole and fractional, within one or more of the aforementioned ranges, are hereby expressly contemplated.

Various additives can be included in the polymeric composite 20. Suitable additives include, but are not limited to, processing additives, plasticizers, chain terminators, surface-active agents, adhesion promoters, flame retardants, anti-oxidants, water scavengers, dyes, ultraviolet light stabilizers, fillers, acidifiers, thixotropic agents, curatives/cross-linkers, catalysts, blowing agents, surfactants, and combinations thereof. The additive(s) may be included in any amount as desired by those of skill in the art.

In some embodiments, the polymeric composite 20 is incorporated into belts (e.g V-belts), hoses, tires, and other products. V-belts are rubber belts, usually endless, with a trapezoidal cross section which runs in a pulley with a V-shaped groove, with the top surface of the belt approximately flush with the top of the pulley, which are used in many different applications. Incorporation of the polymeric composite 20 may be accomplished using methods as are known in the art.

The following examples are intended to illustrate the instant disclosure and are not to be viewed in any way as limiting to the scope of the instant disclosure.

EXAMPLES

Example Coated Fibers 1-4, which are set forth in Table 2 below, are in accordance with the subject disclosure.

TABLE 2

|  | Example 1 | Example 2 | Comp. Example 1 | Example 3 | Example 4 | Comp. Example 2 |
|---|---|---|---|---|---|---|
| Fiber | A | A | A | B | B | B |
| Coating | | | | | | |
| X = coating composition applied via immersion, and then dried to form coating. | | | | | | |
| Coating A | X | X | — | X | X | — |
| Coating B | — | — | X | — | — | X |
| Coating C | X | — | X | X | — | X |
| Notes | | | | | | |
| Process | Double App. of Coating | Single App. of Coating | Double App. of Coating | Double App. of Coating | Single App. of Coating | Double App. of Coating |
| Cut Length (mm) | 3, 6 | 3, 6 | 3, 6 | 3, 6 | 3, 6 | 3, 6 |

Fiber A is a polyester fiber comprising three ends twisted into one and having a denier of about 2000.

Fiber B is a polyamide fiber comprising two ends twisted into one and having a denier of about 1500.

Coating Composition A comprises about 5 percent by weight of a branched polyethylene imine, about 0.5 percent by weight of a surfactant, and about 94.5 percent by weight solvent, based on the total weight of the coating composition.

Coating Composition B comprises about 10 percent by weight isocyanate and about 90 percent by weight solvent, based on the total weight of the coating composition.

Coating C comprises about 20 percent by weight resorcinol formaldehyde latex (RFL) and about 80 percent by weight solvent, based on the total weight of the coating composition.

The coated fibers of Examples 1-4 and Comparative Examples 1 and 2 are cut to a length of 3 mm. Once cut, the coated fibers of Examples 1-4 and Comparative Examples 1 and 2 are compounded into an elastomeric/rubber based belt formulation to form Polymeric Composites ("PC") 1-4 and Comparative PC 1 and 2. The amount and type of each component included in PC 1-4 and Comparative PC 1 and 2 is indicated in Table 3 below with all values in parts per hundred rubber.

All of the components except for the accelerator and curative are first compounded for about 3 minutes in a conventional rubber mixer with a conventional mixing procedure to form a base material. This "first pass" mixing procedure is initiated at a starting temperature of 38° C. (100° F.) and a starting rotor speed of 65 to 75 RPM. This first-pass mixing procedure utilizes sweeps at 82° C. (180° F.), 93° C. (200° F.), and 110° C. (230° F.), with a dump at about 137° C. (280° F.).

Curative and accelerator are added to the PC 1-4 and Comparative PC 1 and 2 are then compounded for about 1.3 minutes at a lower temperature in a conventional rubber mixer with a conventional mixing procedure to form PC 1-4 and Comparative PC 1 and 2. This "second pass" mixing procedure is initiated at a starting temperature of 38° C. (100° F.) and a starting rotor speed of 65 to 75 RPM. This "first-pass" mixing procedure utilizes a single sweep at 82° C. (180° F.) with a dump at about 99° C. (210° F.).

Referring now to Table 3 below, the amount and type of each component included in PC 1-4 and Comparative PC 1 and 2 is indicated with all values in parts per hundred rubber, and the processing parameters utilized in the compounding process are set forth.

TABLE 3

|  | PC 1 | PC 2 | Comp. PC 1 | PC 4 | PC 3 | Comp. PC 2 |
|---|---|---|---|---|---|---|
| Polymer A | 100 | 100 | 100 | 100 | 100 | 100 |
| Filler A | 50 | 50 | 50 | 50 | 50 | 50 |
| Additive A | 15 | 15 | 15 | 15 | 15 | 15 |
| Additive B | 5 | 5 | 5 | 5 | 5 | 5 |
| Additive C | 1 | 1 | 1 | 1 | 1 | 1 |
| Additive D | 1.5 | 1.5 | 1.5 | 1.5 | 1.5 | 1.5 |
| Additive E | 1 | 1 | 1 | 1 | 1 | 1 |
| Additive F | 8 | 8 | 8 | 8 | 8 | 8 |
| Coated Fiber Ex. 1 | 15 | — | — | — | — | — |
| Coated Fiber Ex. 2 | — | 15 | — | — | — | — |
| Comp. Example 1 | — | — | 15 | — | — | — |
| Coated Fiber Ex. 3 | — | — | — | 15 | — | — |
| Coated Fiber Ex. 4 | — | — | — | — | 15 | — |
| Comp. Example 2 | — | — | — | — | — | 15 |
| Total | 196.5 | 196.5 | 196.5 | 196.5 | 196.5 | 196.5 |
| First Pass Processing Notes (Polymer A, Filler, and Additives A, B, C, and D are added) | | | | | | |
| Mix Time | 3.8 | 2.6 | 3.9 | 3.0 | 2.7 | 2.8 |
| Dump Temp. (° C) | 141 | 137 | 139 | 139 | 139 | 138 |
| Integrated Power (HP*min) | 65 | 48 | 69 | 60 | 53 | 51 |
| Second Pass Processing Notes (Additives E and F added) | | | | | | |
| Mix Time | 1.4 | 1.2 | 1.2 | 1.4 | 1.3 | 1.3 |
| Dump Temp. (° C) | 100 | 101 | 100 | 99 | 99 | 100 |
| Integrated Power (HP*min) | 24 | 24 | 21 | 23 | 22 | 21 |

Polymer A is EPDM.
Filler A is carbon black.
Additive A is paraffinic oil.
Additive B is zinc oxide.
Additive C is an antioxidant comprising 4,4'-Bis (alpha, alpha-dimethylbenzyl) diphenylamine.
Additive D is an antioxidant comprising zinc 2-mercaptotolumidazole.
Additive E is an accelerator comprising N,N'-1,3-Phenylene bismaleimide.
Additive F is a curative comprising dicumyl peroxide.

Referring now to Table 3 above, PC 1 and PC 2 require less mix time and power utilization than Comparative PC 1. In fact, PC 2 mixes in the least time, and utilizes the lowest amount of energy of PC1, PC 2, and Comparative PC 1, all of which utilize coated polyether fibers. As such, the coated fibers of PC 1 and PC 2 (Examples 1 and 2 including the branched PEI) are efficiently processed to yield excellent dispersion.

Referring again to Table 3 above, PC 3 and PC 4 require similar mix times and power utilization with Comparative PC 2. As such, the coated fibers of PC 3 and PC 4 (Examples 3 and 4 including the branched PEI) are efficiently processed to yield excellent dispersion.

PC 1-4 and Comparative PC 1 and 2 are tested for:
Mooney Viscosity (ML 1+4): The viscosity or torque of an uncured compound at the specified temperature after a 1 minute preheat plus 4 minutes of testing time. Viscosity is a good indication for how a compound will process on a mill, calendar or in an injection or transfer mold (ASTM D1646-15/Monsanto MV 2000 Viscometer/100° C. (212° F.)/Large Rotor);

MDR Cure Data:
1. Tc50: The time it takes for a compound to reach 50 percent of its total state of cure or crosslinks.
2. Tc90: The time it takes for a compound to reach 90 percent of its total state of cure or crosslinks.
3. Ts2: The time it takes for the viscosity to rise 2 points over the Minimum Torque (ML) value. This is an indication of the time it takes for the compound to begin curing up at the specified temperature. Ts2 can indicate compound shelf life and stability and can help determine if you have enough time to injection or transfer mold. (ASTM D5289-12/TechPro RheoTECH MDR/170° C. (338° F.)/0.5° arc);

Durometer: Measures the hardness of the compound. Higher means a harder compound (Shore A);

Specific Gravity;

Peak Tensile Strength: The maximum force a rubber compound can withstand while being stretched before breaking (ASTM D412-15a, D2240-15);

Tensile Strength at Break: The force a rubber compound can withstand while being stretched before breaking (ASTM D412-15a, D2240-15);

Elongation at Peak Tensile Strength: The length of the specimen at the peak tensile strength expressed as a percentage of its original length (ASTM D412-15a, D2240-15);

Elongation at Break: The length at the breaking point expressed as a percentage of its original length (ASTM D412-15a, D2240-15);

Trouser Tear Strength (ASTM D624-00(2012)), DIE T (Trouser Tear); and

Abrasion Resistance (ISO 4649 (2010): Rotary Drum Abrasion, 40 rpm, 10 N load, Method A—non-rotating test piece).

The test results are set forth in Table 4 below.

TABLE 4

|  | PC 1 | PC 2 | Comp. PC 1 | PC 3 | PC 4 | Comp. PC 2 |
|---|---|---|---|---|---|---|
| Mooney Viscosity ML 1 + 4 (MU) | 75.5 | 74.1 | 75.4 | 88.9 | 89.6 | 89.9 |
| Cure Time, $t_{50}$ (minutes) | 0.73 | 0.74 | 0.75 | 0.65 | 0.67 | 0.69 |
| Cure Time, $t_{90}$ (minutes) | 4.64 | 4.71 | 4.82 | 4.23 | 4.26 | 4.13 |
| Scorch Time, ts2 (minutes) | 0.45 | 0.47 | 0.44 | 0.41 | 0.42 | 0.44 |
| Durometer (Shore A, points) | 80 | 81 | 68 | 81 | 83 | 85 |
| Specific Gravity (g/cm³) | 1.10 | 1.10 | 1.09 | 1.10 | 1.10 | 1.10 |
| Peak Tensile Strength (psi) | 1068 (AG) 1061 (WG) | 1014 (AG) 1363 (WG) | 705 (AG) 772 (WG) | 816 (AG) 1028 (WG) | 875 (AG) 1080 (WG) | 911 (AG) 1044 (WG) |
| Tensile Strength at Break (psi) | 1058 (AG) 1050 (WG) | 1006 (AG) 1353 (WG) | 692 (AG) 764 (WG) | 807 (AG) 879 (WG) | 839 (AG) 864 (WG) | 874 (AG) 912 (WG) |
| Elongation at Peak Tensile Strength (%) | 288 (AG) 274 (WG) | 267 (AG) 263 (WG) | 199 (AG) 179 (WG) | 226 (AG) 32 (WG) | 218 (AG) 12 (WG) | 233 (AG) 15 (WG) |

TABLE 4-continued

|  | PC 1 | PC 2 | Comp. PC 1 | PC 3 | PC 4 | Comp. PC 2 |
|---|---|---|---|---|---|---|
| Elongation at Break (%) | 290 (AG) | 269 (AG) | 203 (AG) | 228 (AG) | 220 (AG) | 237 (AG) |
|  | 275 (WG) | 265 (WG) | 181 (WG) | 179 (WG) | 68 (WG) | 116 (WG) |
| Tear Resistance (Lbf/in) | 94.8 | 78.1 | 41.1 | 84.6 | 95.4 | 89.0 |
|  | 68.8 | 71.9 | 43.1 | 82.7 | 80.8 | 81.3 |
| Abrasion Resistance (mm³) | 234 | 245 | 163 | 258 | 258 | 199 |

Referring to Table 4 above, PC 1-4 exhibit excellent physical properties. In particular, PC 1 and PC 3, which include the fibers of Examples 1 and 2 including the branched PEI, perform particularly well relative to the other polymeric composites.

Referring now to FIGS. 3-8, PC1, PC 2, and Comparative PC 1 are cut and a surface analysis is performed on a Nanotronics nSpec 3D at the following settings:
  Objective Used: 10×
  Topography Scan Settings: ΔZ=0.5; Model=0.4
  3D Model Flattened After Scan
  Peak Threshold: 6
  Peak Tolerance: 0
  Against the Grain (AG): the ends of the fibers can be seen
  With the Grain (WG): the length/side of the fibers can be seen
  The colored images are the 3D models of the surface.

A comparison of the images set forth in FIGS. 3-8 suggests that the fibers of Examples 1 and 2 disperse homogeneously in the PC 1 and PC 2 while the fibers of Comparative Example 1 do not disperse homogeneously in Comparative PC 3. More specifically, both with and against the grain it is apparent that PC 1 and PC 2 comprise well dispersed fibers while the fibers of Comparative Example 1 remain in bundles in Comparative PC 1.

Referring now to FIGS. 9-14, PC1, PC 2, and Comparative PC 2 are cut and a surface analysis is performed on a Nanotronics nSpec 3D at the settings set forth above. The coated fibers of PC 3 and PC 4 (including Examples 3 and 4 including the branched PEI) are efficiently processed to yield excellent dispersion.

It is to be understood that the appended claims are not limited to express any particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described in an illustrative manner, and it is to be understood that the terminology which has been used is intended to be in the nature of words of description rather than of limitation. Obviously, many modifications and variations of the present disclosure are possible in light of the above teachings. It is, therefore, to be understood that within the scope of the appended claims, the present disclosure may be practiced otherwise than as specifically described.

What is claimed is:

1. A coated fiber for polymer reinforcement, said coated fiber comprising:
  A. a fiber having denier of from about 250 to about 3,000 and present in an amount of from about 80 to about 99.8 percent by weight based on the total weight of said coated fiber; and
  B. a coating disposed on said fiber and comprising a branched polyethylene imine and present in an amount of from about 0.2 to about 20 percent by weight based on the total weight of said coated fiber,
  wherein said branched polyethylene imine has a degree of branching of from about 0.30 to about 0.85 as determined via $^{13}$C-NMR in $D_2O$.

2. The coated fiber as set forth in claim 1 wherein said branched polyethylene imine has a weight average molecular weight ($M_W$) of from about 300 to about 2,000,000.

3. The coated fiber as set forth in claim 1 wherein said branched polyethylene imine comprises from about 30 to about 45 percent linear groups, from about 20 to about 30 dendric groups, and from about 30 to about 45 percent terminal groups, based on 100 percent of all groups present in said branched polyethylene imine as determined via $^{13}$C-NMR in $D_2O$.

4. The coated fiber as set forth in claim 1 wherein said branched polyethylene imine is further modified via amidation with fatty acids, alkoxylation with alkylene oxides, and/or by carboxylation with acrylic acid and/or maleic acid.

5. The coated fiber as set forth in claim 1 wherein said coating further comprises a surfactant selected from the group of polyalkyleneoxide, alkylpolyalkyleneoxide, polyoxyethylene sorbitan monolaurate, alkylpolyglucosides, anionic derivatives of alkylpolyglucosides, fatty alcohols, anionic derivatives of fatty alcohols, and phosphate esters.

6. The coated fiber as set forth in claim 1 wherein said fiber is selected from the group consisting of polymeric fibers, natural fibers, glass fibers, ceramic fibers, metallic fibers, carbon and carbon composite fibers, mineral fibers, composite fibers, and combinations thereof.

7. The coated fiber as set forth in claim 1 wherein said fiber comprises a polymer.

8. The coated fiber as set forth in claim 1 wherein said fiber is an aramid fiber.

9. The coated fiber as set forth in claim 1 wherein said fiber is a polyester fiber.

10. The coated fiber as set forth in claim 1 wherein said fiber is present in an amount of from about 90 to about 99 percent by weight based on the total weight of said coated fiber and said branched polyethylene imine is present in an amount of from about 1 to about 10 percent by weight based on the total weight of said coated fiber.

11. The coated fiber as set forth in claim 1 wherein the coated fiber further comprises resorcinol-formaldehyde-latex (RFL).

12. The coated fiber as set forth in claim 1 wherein the coated fiber has a length of from about 0.3 to about 25 mm.

13. The coated fiber as set forth in claim 1 wherein the coated fiber is substantially free of resorcinol-formaldehyde-latex and/or isocyanate.

14. The coated fiber as set forth in claim 1 wherein the coated fiber includes from about 2 to about 8 ends/strands of said fiber.

15. A composite comprising:
a polymer comprising a thermoplastic, an elastomer, or a thermoplastic elastomer; and
said coated fiber as set forth in claim 1.

16. The composite as set forth in claim 15 wherein the composite comprises an elastomer selected from the group consisting of natural rubber (natural polyisoprene), synthetic polyisoprene, polybutadiene, chloroprene rubber, butyl rubber, halogenated butyl rubber, styrene-butadiene rubber, nitrile rubber, ethylene propylene rubber, ethylene propylene diene rubber (EPDM), epichlorohydrin rubber, polyacrylic rubber, silicone rubber, fluorosilicone rubber, and fluoroelastomer.

17. A method of producing a coated fiber, said method comprising:
providing a fiber;
providing a coating composition comprising a branched polyethylene imine having a degree of branching of from about 0.30 to about 0.85 as determined via $^{13}$C-NMR in $D_2O$; and
applying the coating composition to the fiber to form the coated fiber,
wherein the fiber has a denier of from about 250 to about 3,000 and present in an amount of form about 80 to about 99.8 percent by weight based on the total weight of said coated fiber; and
wherein the coating composition disposed on the fiber is present in an amount to from about 0.2 to about 20 percent by weight based on the total weight of said coated fiber.

18. The method as set forth in claim 17 wherein the coating composition further comprises water and/or a surfactant.

19. The method as set forth in claim 17 wherein the fiber has a surface energy of from about 30 to about 60 mJ/m$^2$ and the coating composition has a surface tension of from about 20 to about 65 J/m$^2$.

20. The method as set forth in claim 17 wherein the step of applying is further defined as coating the fiber via spraying, brushing, or immersion.

21. The method as set forth in claim 17 wherein the step of applying is conducted in less than about 10 seconds.

22. The method as set forth in claim 17 wherein the method further comprises the step of heating the fiber subsequent to the step of applying.

23. The method as set in claim 17 wherein the step of applying is further defined as a single application of the coating composition.

24. A coated fiber for polymer reinforcement, said coated fiber comprising:
A. a fiber having denier of from about 250 to about 3,000 and present in an amount of from about 80 to about 99.8 percent by weight based on the total weight of said coated fiber; and
B. a coating disposed on said fiber and comprising a branched polyethylene imine and present in an amount of from about 0.2 to about 20 percent by weight based on the total weight of said coated fiber,
wherein said branched polyethylene imine comprises from about 30 to about 45 percent linear groups, from about 20 to about 30 dendric groups, and from about 30 to about 45 percent terminal groups, based on 100 percent of all groups present in said branched polyethylene imine as determined via $^{13}$C-NMR in $D_2O$.

25. A coated fiber for polymer reinforcement, said coated fiber comprising:
A. a fiber having denier of from about 250 to about 3,000 and present in an amount of from about 80 to about 99.8 percent by weight based on the total weight of said coated fiber; and
B. a coating disposed on said fiber and comprising a branched polyethylene imine and present in an amount of from about 0.2 to about 20 percent by weight based on the total weight of said coated fiber,
wherein the coated fiber has a length of from about 0.3 to about 25 mm.

* * * * *